United States Patent [19]

Kokaji et al.

[11] 4,268,872
[45] May 19, 1981

[54] MAGNETIC DUPLICATOR WITH MULTIPLE COPIES

[75] Inventors: Norio Kokaji; Kunio Kinoshita; Toshihiro Urano; Katsunori Saitoh, all of Tokyo, Japan

[73] Assignee: Iwatsu Electric Co., Ltd., Tokyo, Japan

[21] Appl. No.: 38,823

[22] Filed: May 14, 1979

[30] Foreign Application Priority Data

May 15, 1978 [JP] Japan ............................. 53-64735[U]
Oct. 3, 1978 [JP] Japan ................................ 53-121805

[51] Int. Cl.³ ........................ H04N 1/28; G03G 19/00
[52] U.S. Cl. .................................. 358/301; 346/74.2; 358/287; 358/288
[58] Field of Search ............... 358/301, 213, 287, 288; 346/74.1; 355/3 R, 3 SH, 3 FU, 3 DR, 14; 100/158 R, 161, 162 R, 163 R, 167, 173–174, 176; 271/174, DIG. 2; 68/244, 253 R, 256, 257; 118/114, 116, 644, 651, 621

[56] References Cited

U.S. PATENT DOCUMENTS

| | | | |
|---|---|---|---|
| 2,762,295 | 9/1956 | Varga | 100/158 R |
| 3,161,544 | 12/1964 | Berry | 358/301 |
| 3,301,948 | 1/1967 | Todt | 358/301 |
| 3,684,363 | 8/1972 | Ito et al. | 271/DIG. 2 |
| 3,867,569 | 2/1975 | Watson | 358/213 |
| 3,936,045 | 2/1976 | Ariyama | 271/DIG. 2 |
| 4,022,122 | 5/1977 | Moser et al. | 100/158 R |
| 4,051,484 | 9/1977 | Marlin | 346/74.1 |
| 4,107,742 | 8/1978 | Levy | 358/301 |
| 4,161,738 | 7/1979 | Kokaji | 358/301 |

FOREIGN PATENT DOCUMENTS 282960 4/1965 Australia ..................... 100/158 R

*Primary Examiner*—Raymond F. Cardillo, Jr.
*Attorney, Agent, or Firm*—Woodcock, Washburn, Kurtz, Mackiewicz & Norris

[57] ABSTRACT

In a duplicator, a reflected light from a document or an original copy is converted into an electrical video signal by an image pickup element, and the electrical video signal is supplied to a magnetic recording head to form a magnetic latent image on a magnetic recording drum, in the latent image forming mode. In the copy mode, the magnetic latent image is developed by a magnetic toner, and the toner picture is transferred onto a recording paper which runs through a paper transport path. The transferred toner picture is fixed on the recording paper, and the remaining toner on the surface of the magnetic recording drum is scraped after the transfer operation. A set value of a copy register is compared with a counting value of a copy counter by a comparator. When the counting value reaches the set value, a copy end signal is generated. With the pushing of a copy switch, a control portion of the duplicator operates, first for the latent image forming mode and then for the copy mode. The copy mode is maintained without returning to the latent image forming mode, until the copy end signal is generated.

23 Claims, 15 Drawing Figures

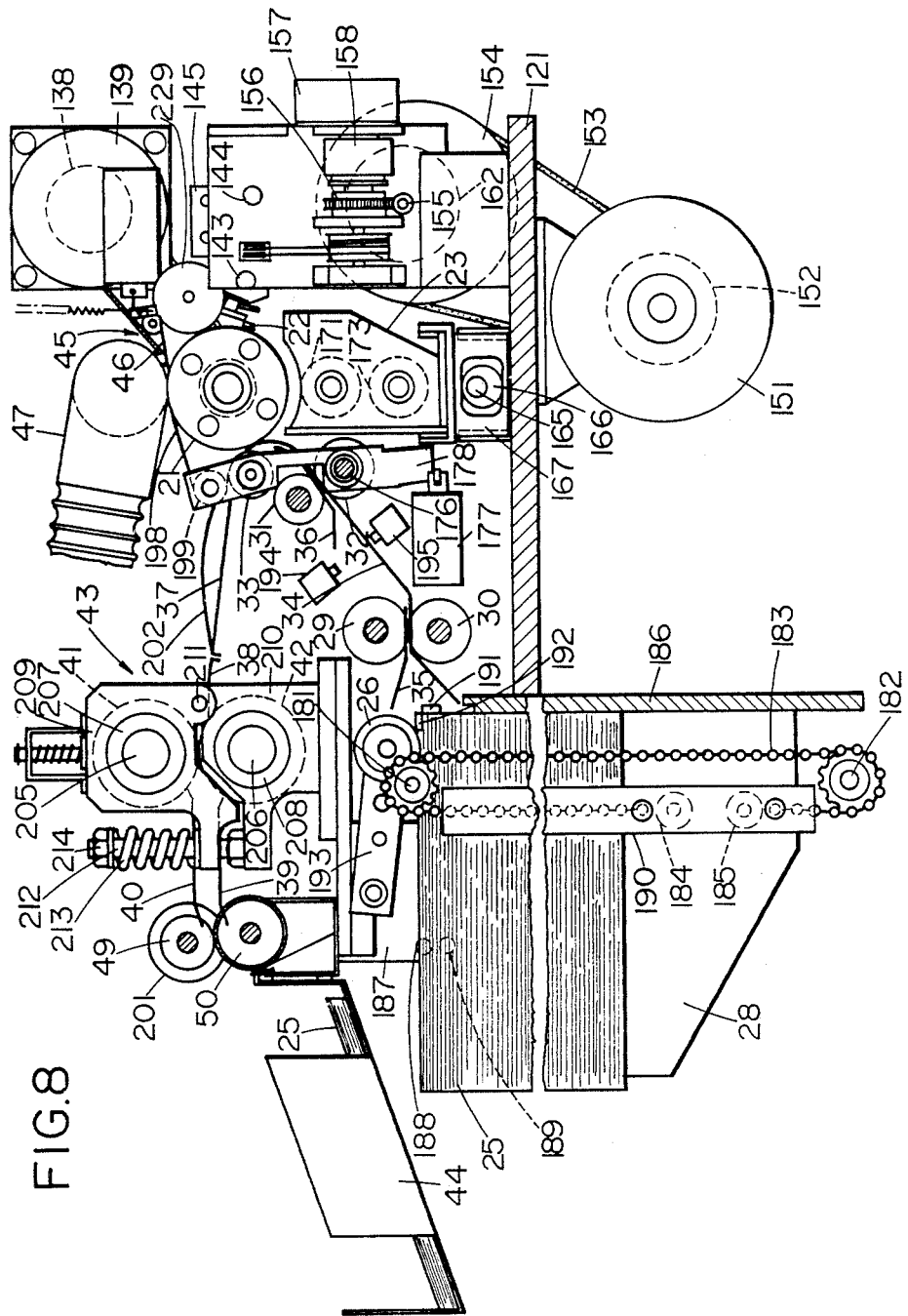

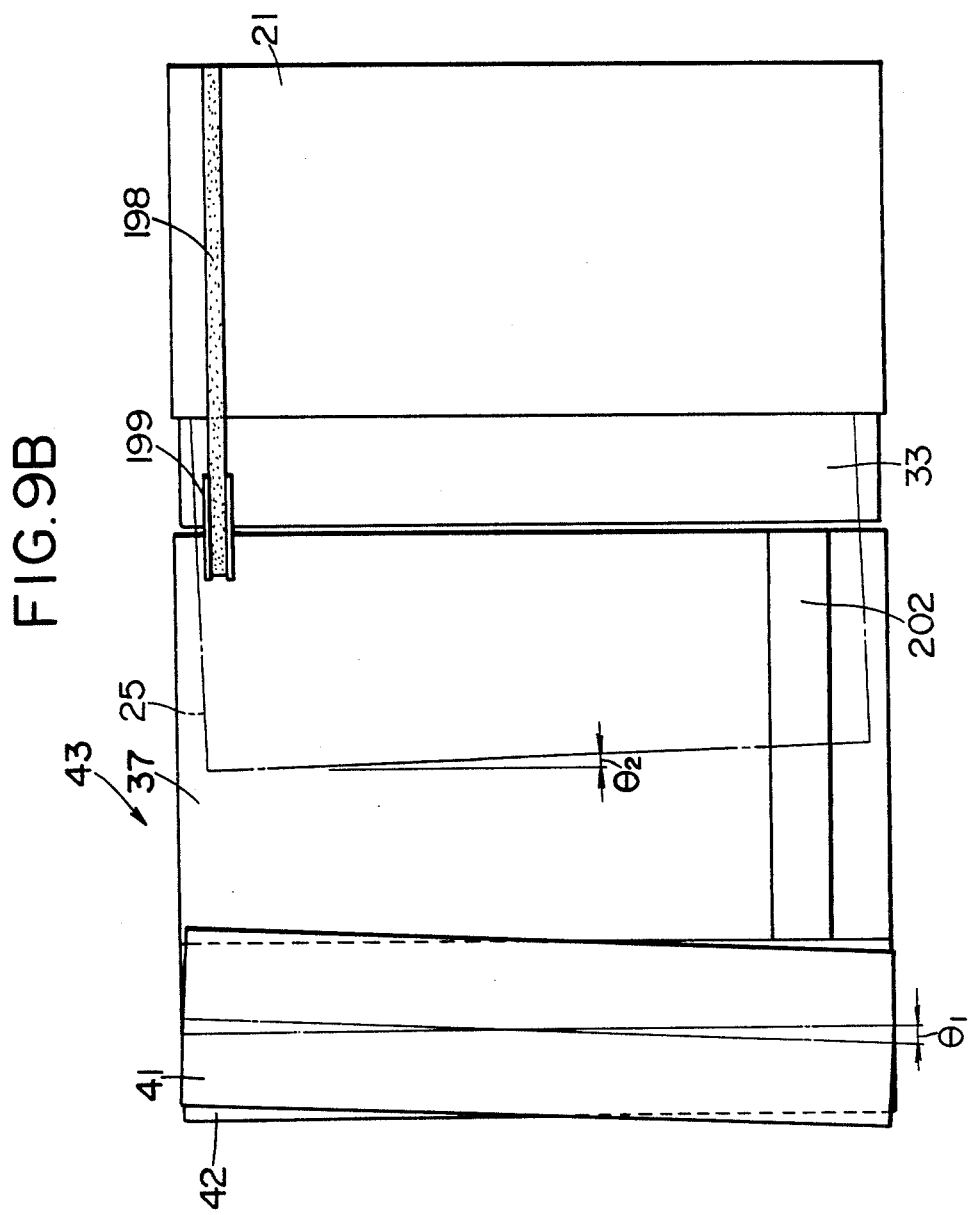

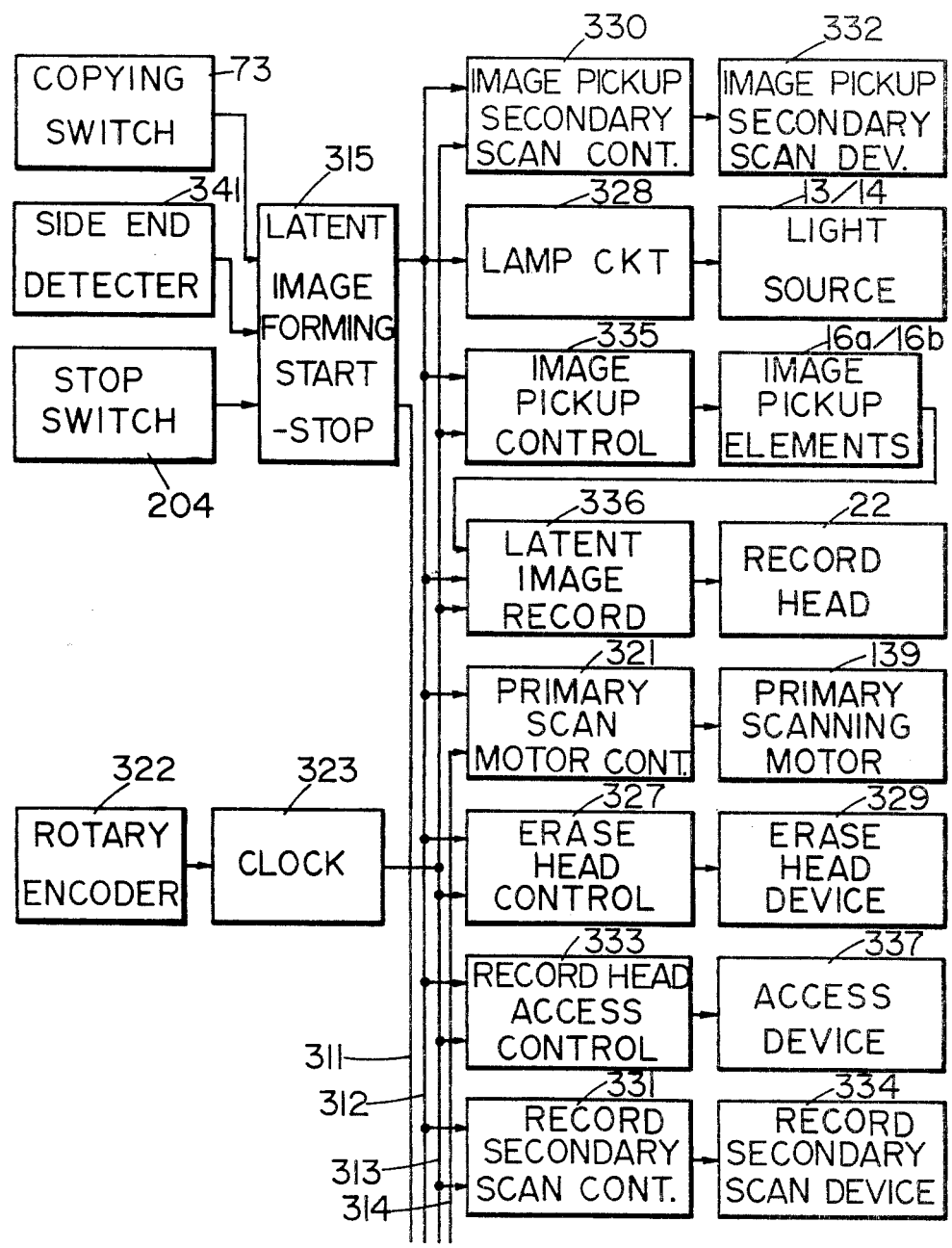

MAGNETIC DUPLICATOR WITH MULTIPLE COPIES

BACKGROUND OF THE INVENTION

1. Field of the Invention

This invention relates to a duplicator, and more particularly to a duplicator by which numerous copies can be automatically and speedily obtained from one original copy.

2. Description of the Prior Art

For example, a Xerography method is employed for a duplicator by which numerous copies can be automatically obtained from one original copy. In the Xerography method, a reflected light from a document is applied onto a photo-conductive drum or a selenium drum to form an electro-static latent image thereon. The electro-static latent image is developed by a toner developing method, and the toner image is transferred onto a recording paper. Then, the transferred image is fixed onto the recording paper.

One example of the duplicator employing the above described method is Xerox-9200 manufactured by Xerox Company. It is superior in operability, but it is inferior in holdability. Only one copy can be obtained from one electro-static latent image. Accordingly, operations for irradiating a document and forming an electro-static latent image onto a photo-conductive drum must be repeated for obtaining numerous copies. Such repetition brings the photo-conductive drum into fatigue. The power consumed is great. Accordingly, the duplicator is uneconomical.

In the duplicator employing another method, a make-up machine to produce a master paper is combined with an offset printing machine to produce copies in use with the master paper. One example of the duplicator employing this method is 1600 Copy System manufactured by A. B. Dick Company. The master paper can be used only once. After use, it is thrown away. It is uneconomical. The machine is large-sized. The maintenance is troublesome.

On the other hand, it is disclosed in the U.S. Pat. No. 4,051,484 that a magnetic latent image is formed to produce a label with bar code for use as a computer input, and it is developed by a magnetic toner.

SUMMARY OF THE INVENTION

These inventors have been struck with such an idea as to apply the methods of the latent image formation and development to a duplicator to automatically produce numerous copies from one document, to overcome the above described defects of the conventional duplicator.

Accordingly, it is an object of this invention to provide a duplicator by which numerous copies can be obtained in one operation of document irradiation and latent image formation, and which is compact in construction and superior in operability.

Another object of this invention is to provide a duplicator in which a latent image recorded on a recording medium for forming a latent image can be erased, and the same recording medium can be repeatedly used for forming new latent image thereon.

A further object of this invention is to provide a duplicator in which a special picture treatment such as enlargement and reduction is possible and copies of a desired picture can be easily obtained.

A still further object of this invention is to provide a duplicator in which, when the transferred toner image is fixed on a recording paper, little noise and disturbance of non-fixed toner image occurs.

In accordance with an aspect of this invention, a duplicator includes a document support for supporting a document to be copied; a light source for irradiating the document; an image pickup element for converting the reflected light or transmitting light from the document into an electrical video signal; an optical member for introducing the light from the document onto the image pickup element; a magnetic recording medium which has a surface for forming a magnetic latent image, the surface being able to move; a magnetic recording head for forming the magnetic latent image on the surface of the magnetic recording medium; a developing device for supplying a magnetic toner onto the surface of the magnetic recording medium to develop the magnetic latent image; transporting members for running a recording paper along a predetermined transport path; a transfer device for transferring the toner image on the surface of the magnetic recording medium onto the recording paper under the condition that the surface of the magnetic recording medium moves and the recording paper runs along the transport path; a fixing device for fixing the transferred toner on the recording paper; a cleaning device for cleaning the remaining toner on the surface of the magnetic recording medium after the transfer; a pulse generator for generating pulses in synchronization with the movement of the surface of the magnetic recording medium; a copy register for presetting the desired number of copies; a copy counter for counting the number of the obtained copies; a comparator for comparing the set number of the copy register with the counted value of the copy counter, the comparator generating a copy end signal when the counted value reaches the set number; and a control unit which operates first for latent image forming mode and then operates for copy mode, with actuation of a copy switch, the operation for copy mode being repeated without returning to the latent image forming mode, until the copy end signal is generated from the comparator, and the operations for latent image forming mode and copy mode being effected in accordance with the timing of the pulses; wherein, in the latent image forming mode, the light from the document is converted into the electrical video signal by the image pickup element, and the electrical video signal is recorded on the surface of the magnetic recording medium to form the magnetic latent image thereon, by the magnetic recording head, and in the copy mode, the magnetic latent image on the surface of the magnetic recording medium is developed by the magnetic toner from the developing means, the toner image is transferred onto the recording paper running along the predetermined transport path by the transfer means, the transferred magnetic toner is fixed on the recording paper by the fixing means, and the remaining magnetic toner on the surface of the magnetic recording medium is cleaned after transfer to prepare it for next development by the cleaning means.

The above and other objects, features and advantages of this invention, will be apparent in the following detailed description of illustrative embodiments which are to be read in connection with the accompanying drawings.

BRIEF DESCRIPTION OF THE DRAWINGS

FIG. 8 is a partially-sectional elevational view of a record portion of the duplicator of FIG. 4;

FIG. 9B is a plan view of a transfer device of the record portion of FIG. 8, a fixing device and a paper feed mechanism arranged between the transfer device and the fixing device;

FIG. 10A is a block diagram of one half of an electrical control portion of the duplicator of FIG. 4;

DESCRIPTION OF CERTAIN PREFERRED EMBODIMENTS

Figure 1:
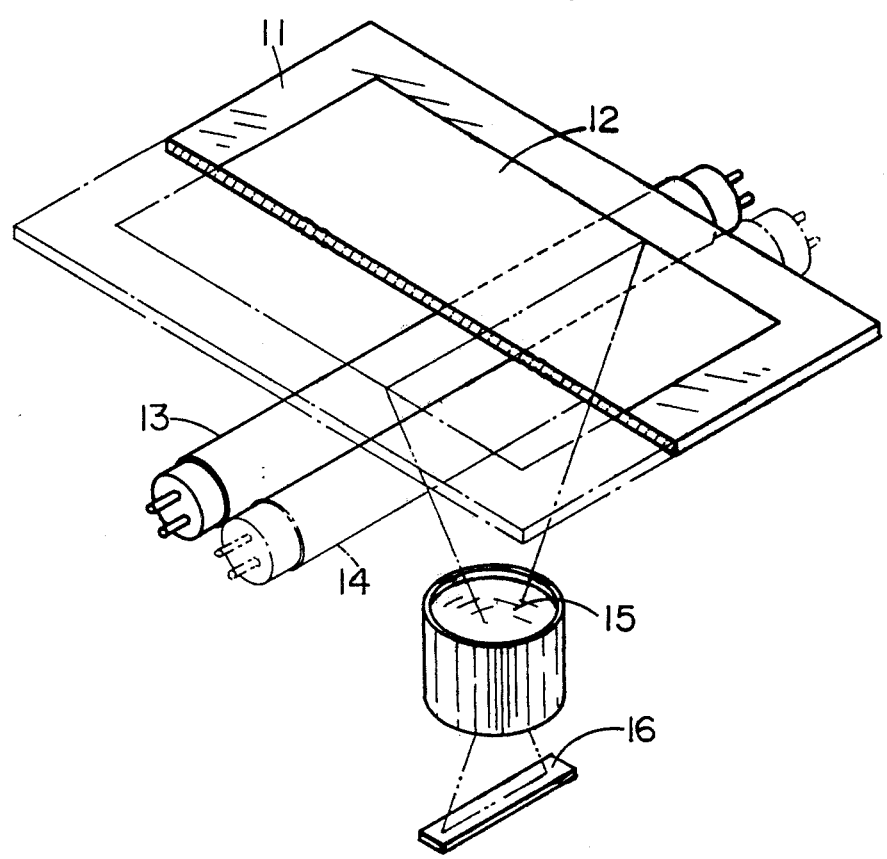
FIG. 1 is a schematic perspective view of an image pickup mechanism showing the principle of an image pickup portion of a duplicator according to one embodiment of this invention.
Figure 2:
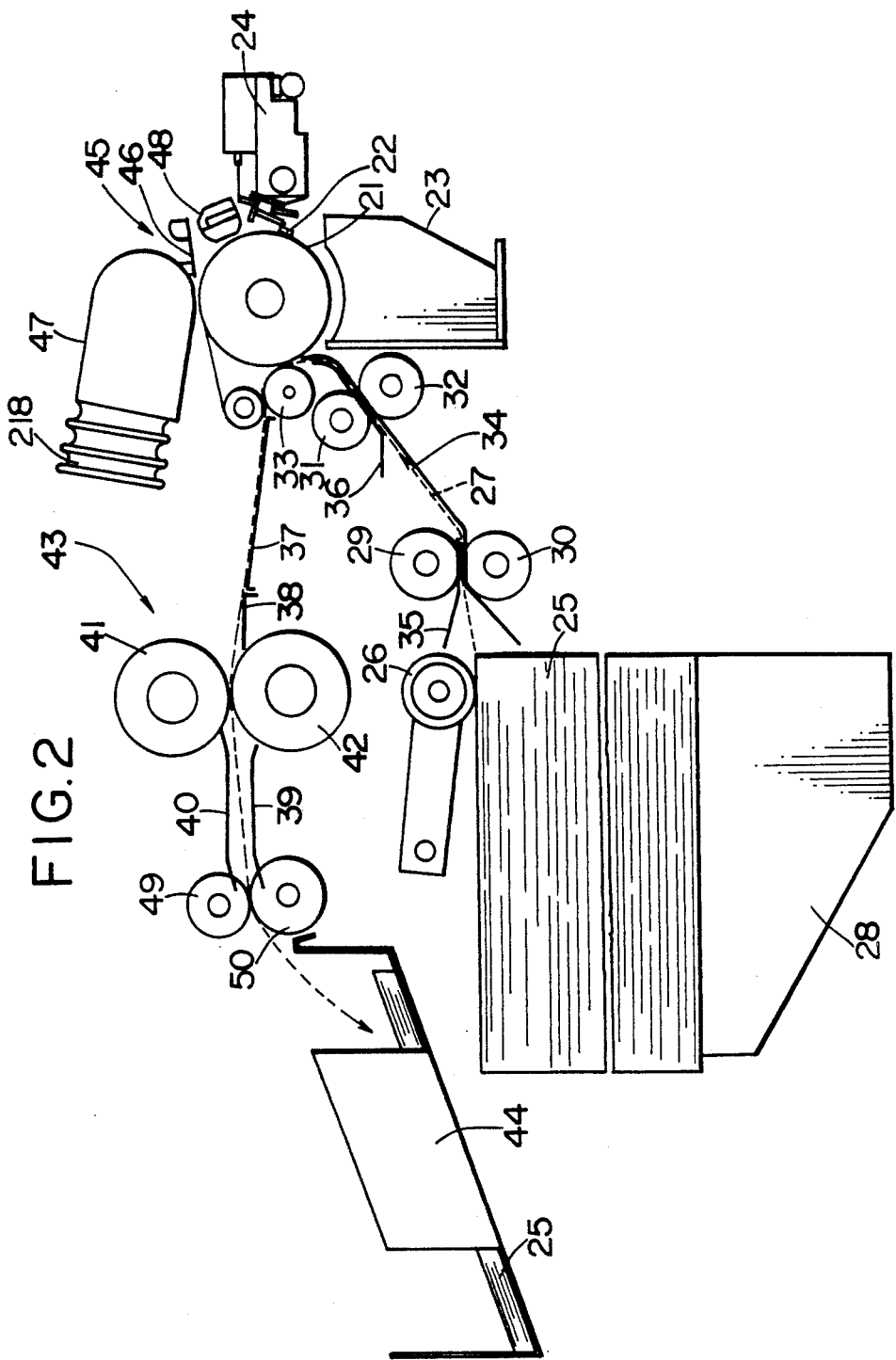
FIG. 2 is a schematic elevational view of a recording mechanism showing the principle of a record portion of the duplicator.
Figure 3:
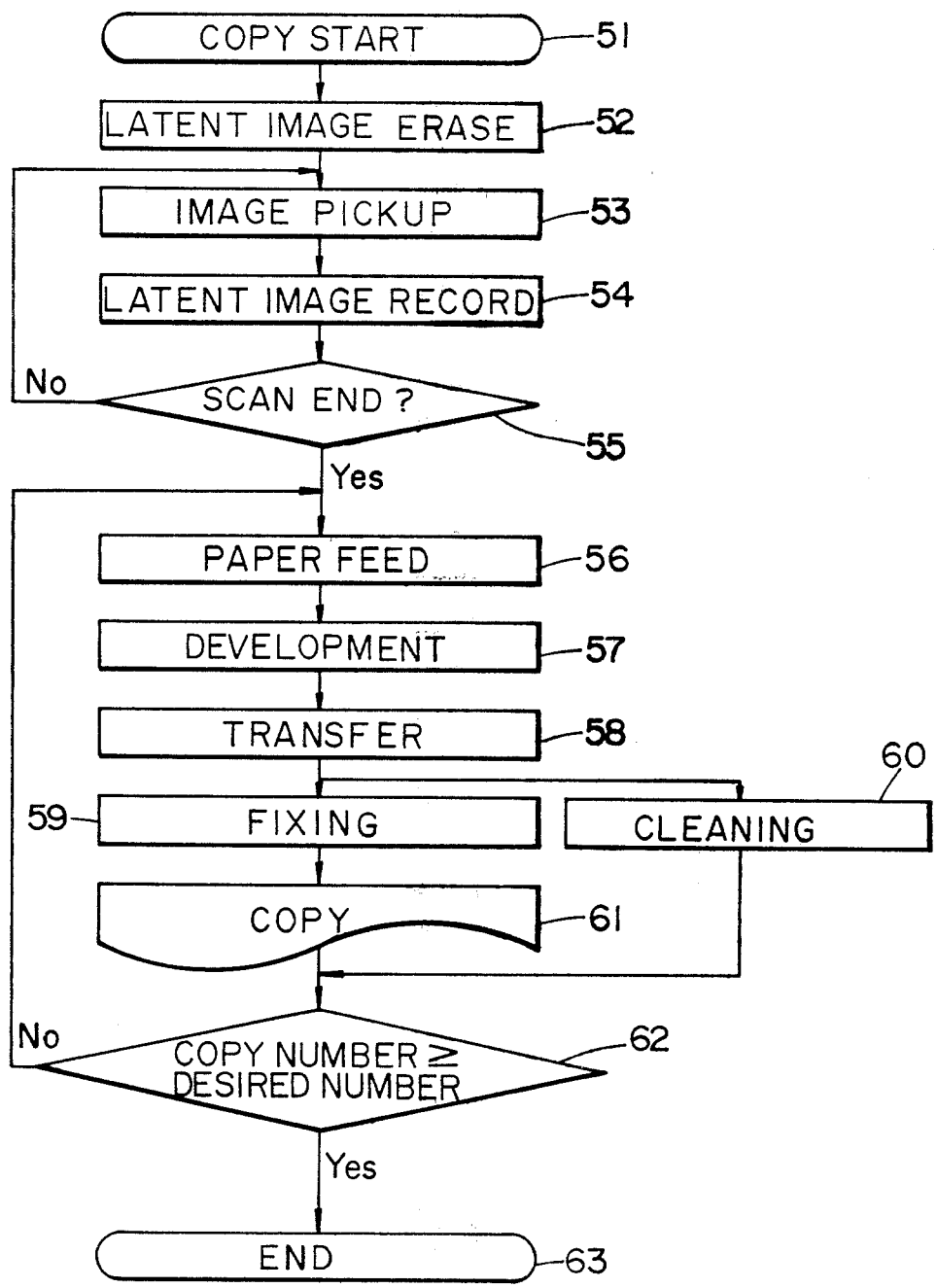
FIG. 3 is a flow chart showing the outline of the principle of operations of the duplicator of FIG. 1 and FIG. 2.

FIG. 1 to FIG. 3 show the principle of a duplicator according to one embodiment of this invention. FIG. 1 shows an image pick-up mechanism constituting a mechanical part of an image pick-up portion of the duplicator. In FIG. 1, an original copy or a document 12 is supported face down on a document support 11 which comprises a transparent (e.g., glass) uniform plate. A part of the document 12 is irradiated by light sources 13 and 14 such as fluorescent lamps. Light from the light sources 13 and 14 is reflected by the surface of the document 12, and converged onto a photoelectric conversion element or an image pick-up element 16 such as a CCD (charge-Coupled Device) by a lens 15. Thus, a real image is formed on the photoelectric conversion element 16. A portion of the real image formed on an effective width of the photoelectric conversion element 16 is converted into an electrical video (picture) signal. The electrical picture signal from the photoelectric conversion element 16 is transmitted to a recording portion of the duplicator. The document support 11 supporting the document 12 is moved relatively to the lamps 13 and 14, the lens 15 and the image pick-up element 16 to obtain the picture signals on the whole surface of the document 12.

FIG. 2 shows a recording mechanism constituting a mechanical part of the recording portion of the duplicator. In FIG. 2, a magnetic recording drum 21 constituting a magnetic recording medium is rotated in the clockwise direction. The picture signal obtained from the image pick-up mechanism shown in FIG. 1 is supplied through a latent image recording circuit of a control portion to be described hereinafter, to a magnetic head 22. A magnetic latent image is formed on the recording drum 21 by the magnetic head 22 which is supported by a sub scanning mount 24. The magnetic latent image is developed by a toner development device 23.

On the other hand, referring to FIG. 2, a record paper 25 is led into a record paper transport path 27 shown by dotted line from a paper supply elevator 28 by a feed roller 26, and it is introduced into the gap between the recording drum 21 and a transfer roller 33 by means of paper positioning rollers 29 and 30, and guide rollers 31 and 32. Paper guide members 34, 35, 36, 37, 38, 39 and 40 are arranged for forming the transport path 27. While the record paper 25 passes between the recording drum 21 and the transfer drum 33, the toner image is transferred onto the record paper 25. The record paper 25 is further transported along the transport path 27, and the toner image is fixed on the record paper 25 between fixing rollers 41 and 42 of a fixing device 43. Then, it is discharged into a copy receiver 44 by discharge rollers 49 and 50. The remaining toner on the recording medium 21 after the above described transferring operation is removed by a cleaning blade 46 and an air accumulator 47 of a cleaning device 45. The latent image on the recording drum 21 is erased by an erasing head 48 which extends over the whole width of the recording drum 21, before a next latent image is formed on the recording drum 21.

FIG. 3 is a flow chart showing the principle of operations of the duplicator.

Duplication or copy starts with a copy (duplicating) switch to be described hereinafter. This operation is denoted by a reference numeral 51. First, the magnetic latent image on the recording drum 21 is erased. This operation is denoted by a reference numeral 52. Next, the image pick-up portion operates for photoelectric conversion to obtain the picture signal. This operation is denoted by a reference numeral 53. The picture signal is converted into a magnetic signal, and recorded as the latent image on the recording drum 21. This operation is denoted by a reference numeral 54. Next, it is checked whether the scanning of the document is completed or not. This operation is denoted by a reference numeral 55. The latent image formation mode is completed with the confirmation of the completion of the scanning of the document. The copy mode follows.

In the copy mode, paper feeding 56, development 57, transfer 58 and fixing 59 are effected in order, and a copy of the document is obtained (copy 61). After the transfer, cleaning 60 is effected in concurrence with the fixing 59. A series of the paper feeding 56, development 57, transfer 58, fixing 59, cleaning 60 and copy 61 is repeated, until the number of the obtained copies reaches a predetermined or desired number. When the copies of the desired number are obtained (number of copies≧desired number) (62), the copying operation ends.

Next, detailed construction of the duplicator according to one embodiment of this invention will be described with reference to FIG. 4 to FIG. 13.

Figure 4:
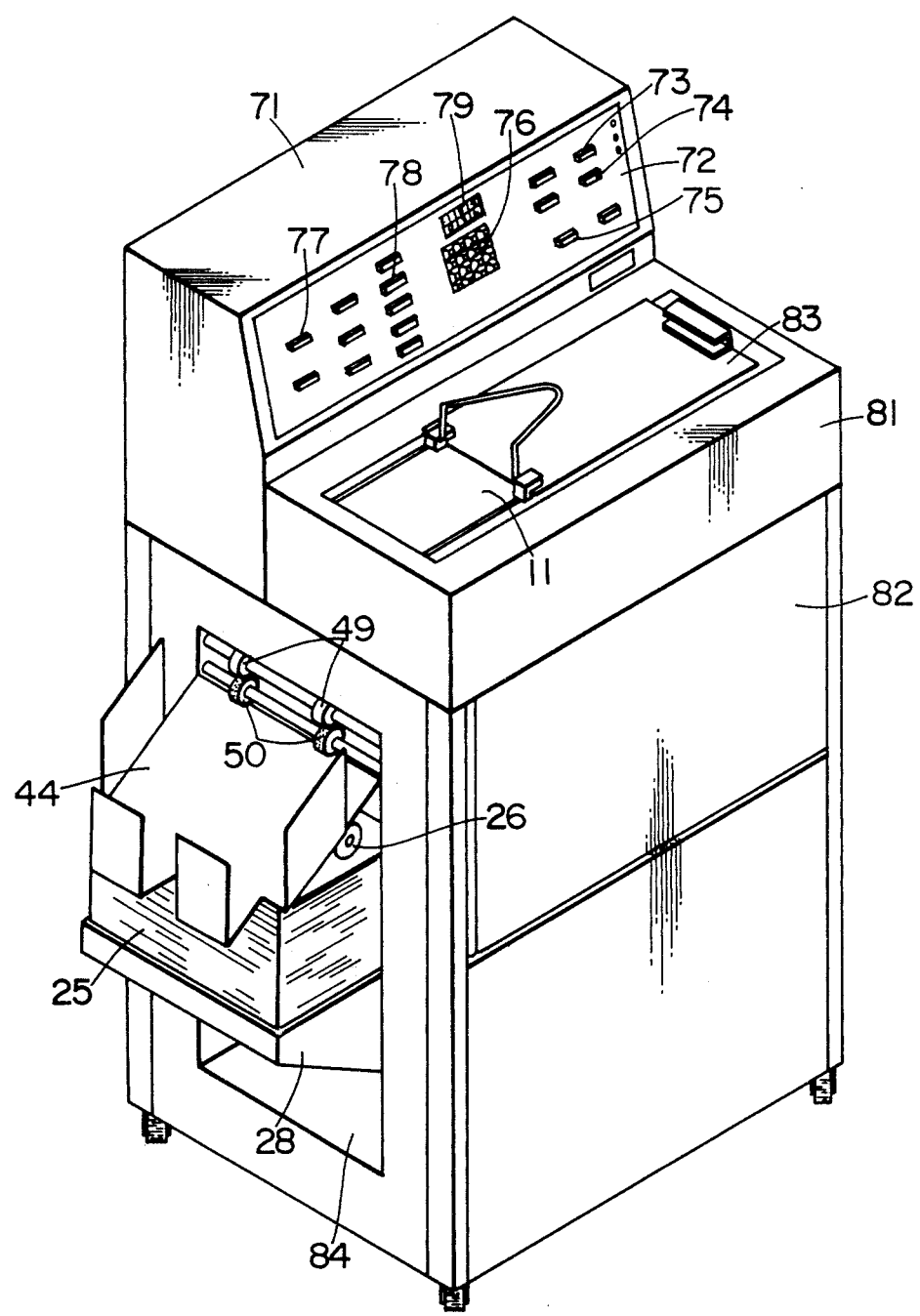
FIG. 4 is a perspective view of the whole of the duplicator whose principle is shown in FIG. 1 to FIG. 3.

FIG. 4 shows an outline of the whole duplicator. The control portion is contained in a projecting part 71 adjacent to the document mount 11. An operation panel 72 is disposed in front of the projecting part 71. There are provided different operating switches such as a copying switch 73, an additional print switch 74, a stop switch 75, a copy number set switch 76, an adjusting switch 77 and an instruction switch 78, and a number display 79.

The image pickup mechanism is contained in a front part 81 adjacent to the document mount 11. The recording portion is contained in a base part 82 below the front part 81. A document press plate 83 is rotatably arranged on the document mount 11. An opening 84 is made in one side wall of the base part 82. The discharge rollers 49 and 50, copy receiver 44, recording papers 25 and elevator 28 supporting the papers 25, of the recording mechanism are exposed in the opening 84.

Examples of dimensions of the outline of the duplicator shown in FIG. 4 are as follows: The maximum width of the duplicator inclusive of the copy receiver 44 is about 720 mm. The depth is about 690 mm. The height is about 1140 mm. The weight is about 170 kg. The power consumption is about 600 vA. Thus, the duplicator is very compact in construction.

Figure 5:
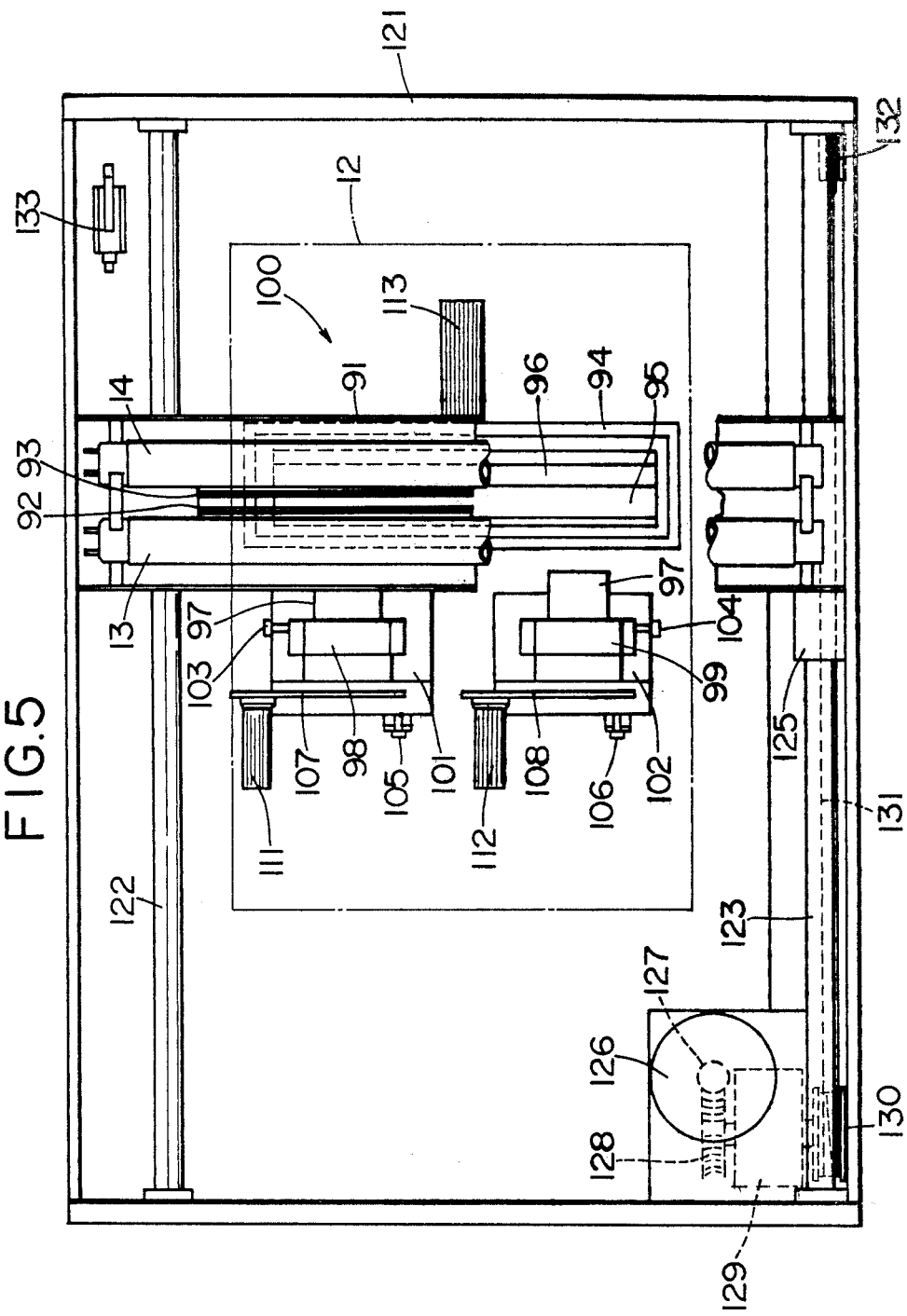
FIG. 5 is a partially-broken plan view of an image pickup portion of the duplicator of FIG. 4.
Figure 6:
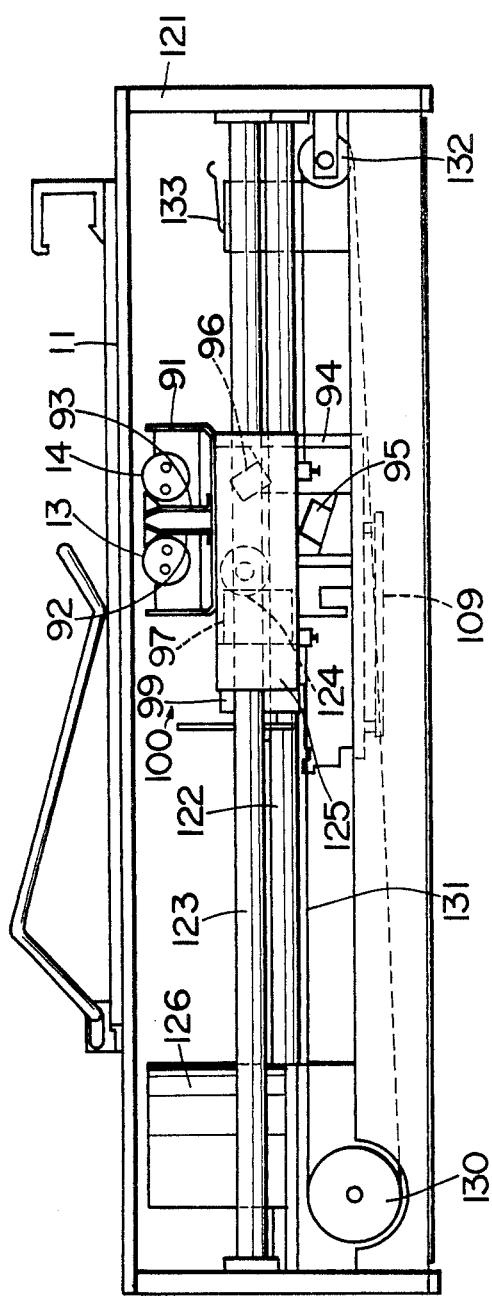
FIG. 6 is an elevational view of the image pickup portion of FIG. 5.
Figure 7:
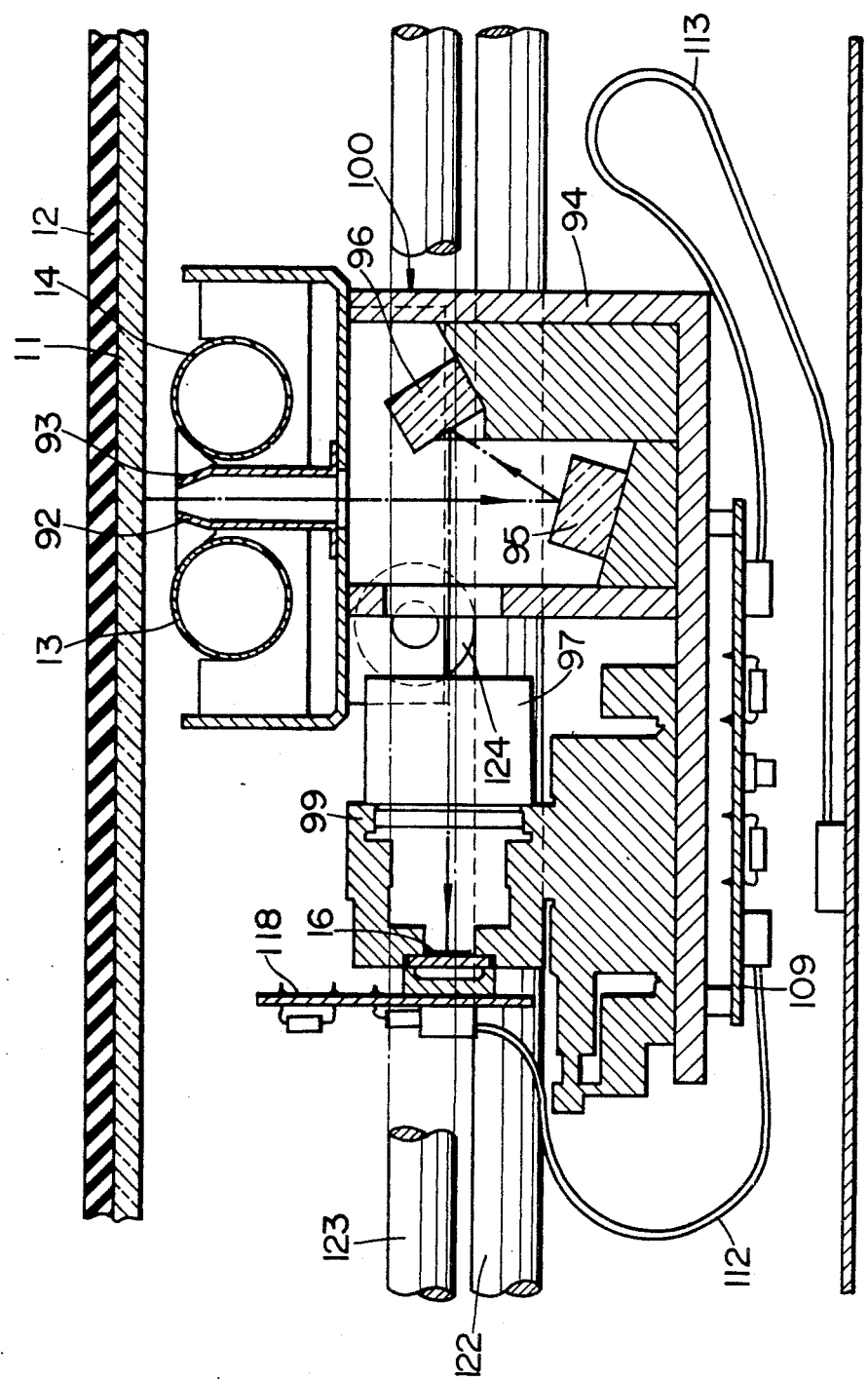
FIG. 7 is an enlarged sectional view of a part of the image pickup portion of FIG. 6.

FIG. 5 to FIG. 7 show details of the image pickup mechanism of the type in which the document 12 is fixed, and the optical system is moved. However, there may be used an image pickup mechanism of the type in which the document 12 is horizontally moved and the optical system is fixed, or in which the document 12 is moved along the curved surface of a drum, and the optical system is fixed.

The document 12 is pressed tight on the document mount 11 by the document press plate 83, and it is irradiated by the long lamps 13 and 14 held by an exposure plate 91. An optical glass plate without scratch and contamination may be used as the document mount 11. It is preferable that the document mount 11 has such a thickness that it is not bent by a thick book mounted. For example, the thickness of the document mount 11 is about 5 mm. Fluorescent lamps of 10 to 20 W may be used as the lamps 13 and 14. They are disposed near the surface of the document 11 to be irradiated. The internal surface of the exposure plate 91 having U-shaped cross-section and holding the lamps 13 and 14 is coated in white, so that illuminance to the document 11 is intensified. One of the fluorescent lamps functions to remove a shadow due to the other of the fluorescent lamps. A reflecting plate such as aluminium foil may be used instead of one of the fluorescent lamps, to omit the one of the latter. Light from the lamps 13 and 14 is reflected by the surface of the document 11, as shown in FIG. 7. The reflected light passes through a slit constituted by a pair of long light-intercepting plates 92 and 93 which are supported by the exposure plate 91. The reflected light is further reflected by a pair of long mirrors 95 and 96 which are arranged within a dark box 94. The long light-intercepting plates 92 and 93, and the long mirrors 95 and 96 extend over the effective width of the document mount 11. Light other than the reflected light from the surface of the document 12 is intercepted by the dark box 94. The inner surface of the dark box 94 may be coated matly in black for obtaining an image of striking contrast. A certain flatness is required for the mirrors 95 and 96. An optical glass having thickness of 10 mm and Newton's ring value of more than 8 is preferable. Aluminium is vapor-deposited on the grinded optical glass to form a plane mirror. Such plane mirrors are preferable for the mirrors 95 and 96. If size is not at a premium in the construction of the devce, the mirrors 95 and 96 may be omitted since they permit it to be made smaller.

The reflected light emitting from the dark box 94 is focussed into a real image onto the image pickup element 16. Four groups of five lenses having resolving power of 40 lines/mm, 50% and focal length of 30 mm (F4) may be used as the optical system 97. A lens of long focal length can be reasonably used from the view point of field angle. However, it makes the device large-sized. Accordingly, a lens of focal length of 20 to 40 mm is practically preferable. The "reasonable use" of the lens means that only a central portion of the lens having high power is utilized.

The above described CCD may be used as the image pickup element 16. The CCD have elements of the number which is required for obtaining a necessary resolving power. The number of the elements constituting the CCD determines a resolving power. In this embodiment, two CCDs 16 and lens systems 97 are used to improve the resolving power, as suggested by FIG. 5. A photo diode array may be used instead of the CCD. The two lens systems 97 and CCDs 16 are held by lens holders 98 and 99 which are mounted on fine-adjustment devices 101 and 102. It is difficult to set the two lens systems 97 and CCDs 16 at the same time. Accordingly, it is preferable that the two are individually adjusted for focussing or readout position. The fine-adjustment devices 101 and 102 are so designed as to move the holders 98 and 99 forwards and backwards, leftwards and rightwards, and upwards and downwards, and to rotate or swing the holders 98 and 99, respectively. The holders 98 and 99 are moved leftwards and rightwards by the feed screws 103 and 104, and moved forwards and backwards by the feed screws 105 and 106. Further, the holders 98 and 99 are moved upwards and downwards through a pair of plates having slant surfaces (not shown) by a pair of feed screws (not shown). Still further, the holders 98 and 99 are rotated by another pair of feed screws (not shown). Cylindrical projections (not shown) are formed on the bottom surface of the holders 98 and 99. Annular grooves (not shown) are formed on the upper surface of the fine-adjustment devices 101 and 102. The cylindrical projections are fitted to the annular grooves. Thus, the holders 98 and 99 can be swung leftwards and rightwards. They can be individually adjusted to respective right positions by the fine-adjustment devices.

The CCDs 16 are mounted on printed boards 107 and 108, and connected through another printed board 109 and flat cables 111, 112 and 113 to an image pickup control circuit and a latent image recording circuit of the control portion of the duplicator, to be described hereinafter (see FIG. 10A and FIG. 10B).

The exposure plate 91, the dark box 94, the lens holders 98 and 99, the fine-adjustment devices 101 and 102 and the printed boards 107 and 108 are combined with each other, as one body, and they constitutes an optical system carriage or an image pickup carriage 100.

As shown in FIG. 5 to FIG. 7, guide rods 122 and 123 are extended in parallel with each other in a frame 121. A guide roller 124 supported through a mounting leg (not shown) by the exposure plate 90 rotatably rides on the one guide roller 122, and the other guide rod 123 is slidably fitted into a slide bush housing 125 including a pair of slide bearings which is mounted on the exposure plate 90. The rocking of the image pickup carriage 100 is prevented by the pair of the slide bearings included in the slide bush housing 125. Thus, the image pickup carriage 100 can move forwards and backwards (FIG. 5) along the guide rods 122 and 123 through the guide roller 124 and the slide bush housing 125.

A pulse motor 126 for driving the image pickup carriage 100 is arranged at one corner of the frame 121. A worm is formed on a shaft 127 of the pulse motor 126, and it is engaged with a worm gear 128 which is connected through an electro-magnetic clutch 129 to a drive pulley 130. A stainless wire 131 is wound on the drive pulley 130 and a guide pully 132 which is arranged at another corner of the frame 121. Both ends of the stainless wire 131 are fixed to lower portions of the slide bush housing 125.

The rotational force of the pulse motor 126 is transmitted through the motor shaft 127, worm gear 128, electro-magnetic clutch 129, drive pulley 130 and stainless wire 131 to the image pickup carriage 100 to move the latter right-wards (FIG. 5). Thus, the whole surface of the document 12 is sub-scanned to be read by the image pickup carriage 100.

The image pickup carriage 100 is moved rightwards (FIG. 5) until it contacts with an end detection switch 133 to detect the end of sub-scanning. With the detection of the end, the electromagnetic clutch 129 is deenergized to disconnect the worm gear 128 from the drive pulley 130. Accordingly, the image pickup carriage 100 is automatically moved back to the original position by a well-known restoring device (not shown) including a restoring spring and a governer.

Figure 9A:
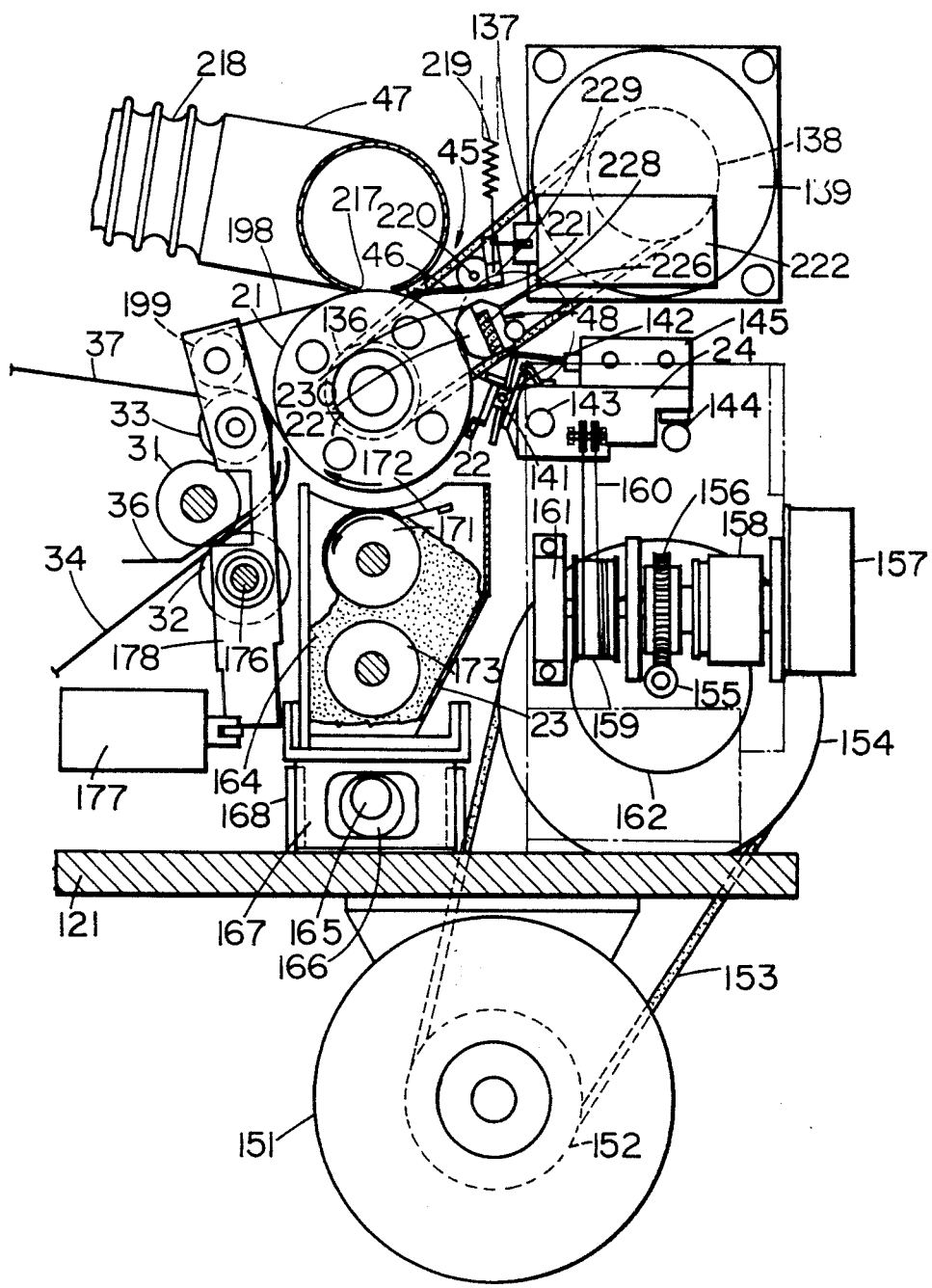
FIG. 9A is an enlarged sectional view of a part of the record portion of FIG. 8.

FIG. 8, FIG. 9A and FIG. 9B show details of the recording mechanism. As shown in FIG. 9A, a pulley 136 is combined through a clutch means such as a one-way clutch or an electromagnetic clutch with the recording drum 21. A belt 137 is wound on the pulley 136 and another pulley 138 combined with a primary scanning motor 139 for driving the recording drum 21. The base of the recording drum 21 may be made of non-magnetic material such as brass, aluminium (metal), vinyl chloride resin (synthetic resin). A magnetic film as a magnetic recording medium is formed on the base of the recording drum 21. Preferably, Co-Ni, Co-Ni-P or Co-P metal is plated on the base of the recording drum 21 for forming the magnetic film thereon. It is preferable that the thickness of the magnetic film and the coercive force thereof are 0.1 to $10\mu$, and 150 to 1000 oersteds, respectively. It is more preferable that they are 0.5 to $2\mu$, and 200 to 500 oersteds, respectively. According to this invention, they are not always limited to the above-described ranges. Further, a protecting film of non-magnetic Ni-P metal, hard chromium, Rh or $SiO_2$ may be deposited, to the depth of 0.1 to $10\mu$, onto the magnetic film by an electro-plating method or sputtering method, to improve wear-resistance of the recording drum 21. It is preferable that the hardness of the surface of the recording drum 21 is more than 400 in Vicker's hardness. It is more preferable that it is more than 600 in Vicker's hardness.

$\gamma$-$Fe_2O_3$ or $CrO_2$ may be used as the material of the magnetic film. And a suitable resin or carbon may be used as the material of the protecting film. It is preferable that resistivity of the surface of the recording drum 21 is low for the purpose of preventing back-contamination due to development. For example, it is lower than $10^{12}$ $\Omega$cm. More preferably, it is lower than $10^8$ $\Omega$cm. Metal film of Ni-P or Cr is particularly preferable. For example, the diameter of the recording drum 21 and length thereof are 68.5 mm and 320 mm, respectively.

The magnetic recording head 22 is supported by a head holder 141 which is so supported by an axle 142 as to be rotatable relative to the secondary scanning mount 24. The latter can move on two guide rods 143 and 144 along the axial direction of the recording drum 21, namely perpendicular to the surface of the drawing of FIG. 9A. A plunger-solenoid 145 is arranged on the secondary scanning mount 24. On the latent image record, the plunger-solenoid 145 is energized to rotate the head holder 141 round the axle 142 in the clockwise direction (FIG. 9A), and so the head 22 comes closely to the surface of the recording drum 21. The plunger-solenoid 145 is deenergized, when the duplicator is not in the latent image record. The head 22 is separated far from the surface of the recording drum 21. In the latent image record, the recording head 22 contacts with the surface of the recording drum 21, or a little gap of 0.1 to $30\mu$ is maintained between the recording head 22 and the surface of the recording drum 21. Generally, when the recording drum 21 rotates at a low speed, it is preferable that the head 22 contacts with the surface of the recording drum 21. And when the recording drum 21 rotates at a high speed, it is preferable that the head 22 is separated from the surface of the recording drum 21 in such a manner that the head 22 is floated by air flow occurring due to the rotation of the recording drum 21. The non-contact recording is preferable from the view point of the life of the recording drum 21 and recording head 22. However, when the recording drum 21 is constructed in the above-described manner, the recording drum 21 and the recording head 22 can practically have a sufficiently long life even in the contact recording method.

Experiments of latent image records of 500,000 were made for a test sample of a recording drum 21 in which base material was Ni-Zn group ferrite, a magnetic film was formed of Co—Ni—P metal and a protecting film was formed of Ni—P. The contact pressure of 5 grams was given between the surface of the recording drum 21 and the recording head 22 by a spring. Practically, any trouble was not made in the recording drum 21 and the recording head 22. The eccentricity of the recording drum 21 is compensated by a leaf spring through which the head 22 is mounted by the holder 141. Accordingly, the contact pressure between the surface of the recording drum 21 and the head 22 is always maintained at a small force.

A copy motor 151 to rotate the recording drum 21 at a lower speed in the copy mode is disposed under the frame 121. The rotational force of the copy motor 151 is transmitted through a motor pulley 152, a belt 153, a belt pulley 154 and a wellknown drive mechanism including a clutch means such as one way clutch or electromagnetic clutch (not shown) to the recording drum 21. A pulse motor 162 for the sub-scanning is so arranged that the axis of the belt pulley 154 is near the axis of the pulse motor 162. The rotational force of the motor 162 is transmitted through a worm formed on its shaft 155 to a worm gear 156. The rotation of the worm gear 156 is adjusted by a governer 157, and transmitted through an electro-magnetic clutch 158 to a drive pulley 159. A wire 160 is wound on the drive pulley 159. Both ends of the wire 160 are fixed through a guide pulley (not shown) to the secondary scanning mount 24.

The rotational force of the drive pulley 159 is transmitted through the wire 160 to the secondary scanning mount 24 to move the latter to the front of the surface of the drawing of FIG. 9A from the back thereof perpendicular thereto. The recording drum 21 rotates for primary scanning. The surface of the recording drum 21 is spirally scanned by the recording head adjacent to the recording drum 21 for latent image recording. The end of the secondary scanning is detected by a not-shown detecting switch to deenergize the electro-magnetic clutch 158. The worm gear 156 is disconnected from the drive pulley 159. The secondary scanning mount 24 is moved back to the original position by a restoring mechanism including a restoring spring 161 and a governer 157.

In this embodiment, a single head is used as the recording head 22. However, plural heads may be used as the recording head 22. When plural recording heads 22 are arranged in array for one scanning line, they do not need to be moved for scanning. Electrical signals are applied to the heads 22 for latent image recording.

A magnetic toner 164 used in the development device 23 consists of magnetic powder for developing the magnetic latent image on the recording drum 21 and resin or wax for transferring and fixing the image onto the recording paper 25. It may comprises one kind of particles, or two kinds of particles. It is preferable that the magnetic powder has high permeability. For example, it is pure iron, tri-iron tetroxide or nickel. When the magnetic toner 164 consists of two kinds of particles, it was experimentally proved that the preferable grain size of the particles is 5 to 50$\mu$. When the magnetic toner 164 consists of one kind of particles in which magnetic powder is mixed with resin or wax, it was experimentally proved that the preferable grain size of the magnetic powder is smaller than 5$\mu$, and that the more preferable grain size of the magnetic powder is smaller than 1$\mu$. In the latter case, it was experimentally proved that the preferable grain size of the particles is predominantly 5 to 40$\mu$. Preferably, the ratio of the magnetic powder in the magnetic toner is 40 to 80% by weight. And more preferably, it is 50 to 70% by weight. It is preferable to use resin having a softening point of 70° C. to 200° C. Examples of such resin is cellulose ester such as ethylene.vinylacetate copolymer, cellulose ether, vinyl chloride such as polyvinyl buthyral, acryl resin such as N-buthylmethacrylate, styrene resin and epoxy resin. Preferably, the ratio of resin in the magnetic powder is 0 to 15% by weight.

It is preferable to use wax having a melting point of 50° to 130° C. Examples of such wax are fatty wax such as paraffin, a fatty acid derivative such as ethylen glycol hydroxystearate or hydroxystearic acid or castor wax, metal salt of fatty acid such as aluminium stearate, and an amide hydroxy wax such as N(2.hydroxyethyl).12-.hydroxystearyl amide. Preferably, the ratio of wax in the magnetic toner is 20 to 60% by weight. And more preferably, it is 25 to 50% by weight.

When the toner is of the type thermally fixed, the content of wax may be 20 to 60% by weight (preferably 30 to 50% by weight) without using wax. And when the toner is of the type fixed by pressure, the content of resin may be zero. Further, it is preferable that a fluidizable agent such as amorphous colloidal silica is added in amount of about 0.1% by weight to improve fluidity of the toner. Further, a suitable dyestuff, pigment and conductive powder such as carbon black may be added to control color and resistance of the toner. When triiron tetroxide ($Fe_3O_4$) is used as the magnetic powder, the obtained toner is black. When pure iron is used as the magnetic powder, the obtained toner is grey. In that case, it is preferable to add carbon black to obtain a black toner. Further, it is possible to obtain a yellow, magenta or cyan toner. Carbon black may be used to control resistance of the magnetic toner.

The development device 23 is separated from the recording drum 21 as shown in FIG. 9A except the time when the duplicator is in the copy mode. On the copy mode, an eccentric cam 166 fixed on a rotary shaft 165 is rotated by half revolution to raise a cam follower 167 and therefore the development device 23 along a cam follower guide 168. The development device 23 comes close to the recording drum 21. When the copies of the required number have been obtained, the eccentric cam 166 is rotated by half revolution to lower the development device 23 to the original position shown in FIG. 9A.

In the development device 23, the magnetic toner 164 is supplied onto the recording drum 21 by a developing roller 171 which contains a stationary permanent magnet. The magnetic toner 164 is carried on the rotating developing roller 171 by magnetic force of the permanent magnet. The intensity of magnetic field from the developing roller 171 is low at the position at which the developing roller 171 is close to the recording drum 21. When the intensity of magnetic field at the position is lower than 300 gau$\beta$ (preferably 150 gau$\beta$) according to a gau$\beta$ meter GM 102 manufactured by Electric Magnetic Industry Co., Ltd., a good developing result can be obtained. The intensity of magnetic field from the developing roller 171 is higher at any other position at which the developing roller 171 is further from the recording drum 21. For example, it is higher than 300 gau$\beta$. When the recording drum 21 is rotated at the speed of 100 r.p.m. to obtain one hundred of copies of size A4 per minute, a good result can be obtained in such a manner that the developing roller 171 and the recording drum 21 are rotated in opposite directions. In FIG. 9A, the recording drum 21 is rotated in the clockwise direction as shown by the arrow, while the developing roller 171 is rotated in the counter-clockwise direction. The direction of the peripheral movement of the recording drum 21 coincides with the direction of the supply of the magnetic toner 164 at the position at which the developing roller 171 is close at the recording drum 21. The supply amount of the toner is adjusted by a toner level regulating plate 172. It is preferable that the gap between the recording drum 21 and the developing roller 171 is about 0.5 to 3 mm in the copy mode in which the developing device 23 is located at the upper position. And it is preferable that the depth of the magnetic toner after regulated by the regulating plate 172 is larger by 0.1 to 2 mm than the gap between the recording drum 21 and the developing roller 171. A feeding roller 173 disposed under the developing roller 171 is so designed as to feed the toner upwards, and it serves to increase the content of the toner 164 in the developing device 23.

The transfer roller 33 is separated from the recording drum 21 during the latent image record. However, in the copy mode, a plunger-solenoid 177 is energized to rotate a lever 178 supporting the transfer roller 33 round a shaft 176 in the clockwise direction as shown in FIG. 9A and to press the transfer roller 33 through the recording paper 25 onto the recording drum 21. Dielectrics having isocyanate group

such as polyurethane resin, polyurethane rubber and polyamide resin (Nylon) is most suitable as material of the transfer roller 33. One example of such dielectrics is "Vulcollan 3" (urethane rubber of polyester group) manufactured by Baier Co., West Germany. It is preferable that hardness of the material of the transfer roller 33 is 10 to 50 degrees. A voltage is applied between the transfer roller 33 and the recording drum 21 to improve a transfer efficiency for the recording paper 25. For example, when the above described polyurethane rubber of the thickness of 2.5 mm and of the hardness of 30 degrees is coated on an aluminum core to form the transfer roller 33, a DC voltage of 100 to 1500 volts is applied between the recording drum 21 and the transfer roller 33 to obtain a good result. The optimum value of the DC voltage depends on the kinds of paper and toner. The magnetic toner 164 is charged with electricity, because of friction and stir in the developing device 23, injection of charge from the recording drum 21 and induction. The toner is electrostatically removed from the recording drum 21 onto the recording paper 25. Thus, it is transferred onto the recording paper 25.

Generally, a dielectrics roller such as the transfer roller 33 is deteriorated in electrical characteristics due to dielectric polarization in a short time. However, since the applied voltage is low, there is practically no trouble in the duplicator according to this invention. However, the life of the transfer roller 33 can be lengthened in such a manner that no voltage or voltage of opposite polarity is applied to the transfer roller 33 during the latent image record or when not in the copy mode, or that polarity of voltage is inverted every records of latent images, to recover the polarization earler. Or a corona transfer method may be employed instead of the transfer roller 33.

Referring to FIG. 8, both ends of a chain 183 are fixed to the paper elevator 28. The chain 183 is wound on upper and lower sprockets 181 and 182. Guide rollers 184 and 185 are rotatably supported on the elevator 28, and they can roll on a guide rail 190 fixed to the frame 121. The rotational force of one of the above described motors is transmitted to the lower sprocket 182, to drive the elevator 28 upwards and downwards. The piled papers 25 are moved upwards and downwards together with the elevator 28 along paper guide plates 186 and 187, and they are located at an operative position to feed a recording paper by means of paper position detecting elements 188 and 189 and an elevator control circuit (see FIG. 10B) of the control portion to be described hereinafter. The paper position detecting elements 188 and 189 constitute a paper detector (FIG. 10B) to be described hereinafter. Upper and lower limit positions of the elevator 28 are regulated by limit switches (not shown). The papers 25 are fed one by one, while the elevator 28 gradually moves upwards. When all of the papers have been fed, the elevator 28 is automatically or manually moved downwards at once.

The recording paper 25 may be a normal paper. The papers 25 are separated one by one by function of separating tabs 192 fixed to both ends of a paper holding lever 191 in the feeding operation, and led into the paper transport path (FIG. 2) by the paper feeding roller 26 supported by a supporting lever 193 and the positioning rollers 29 and 30. And the paper 25 is introduced between the transfer roller 33 and the recording drum 21 by the guide rollers 31 and 32, and the paper guide members 34, 35 and 36. A light emitting element 194 and a light-sensitive element 195 are arranged at the opposite sides of the guide member 34. The elements 194 and 195 constitute a paper feed detector to be described hereinafter (FIG. 10B).

Immediately before the top end of the recording paper 25 enters the gap between the transfer roller 33 and the recording drum 21, the plunger-solenoid 177 is energized to rotate the lever 178 round the shaft 176 in the clockwise direction (FIG. 9A). Thus, the transfer roller 33 is moved close to the recording drum 21, and the recording paper 25 is pinched between the transfer roller 33 and the recording drum 21. A DC voltage, for example, 800 volts is applied to the transfer roller 33. The toner is transferred from the recording drum 21 onto the recording paper 25. After the transfer, the recording paper 25 is separated from the recording drum 21 by a separating belt 198 and a tension pulley 199, and then it is fed through the guide members 37 and 38 to the fixing device 43 including the fixing rollers 41 and 42. As shown in FIG. 9B, the width of the separating belt 198 is relatively small. The separating belt 198 is endless, and wound on one end portion of the recording drum 21 and the tension pulley 199 which is supported by the lever 178. The toner image is fixed on the recording paper 25 by passing through the fixing rollers 41 and 42. And the paper 25 is moved between the discharge rollers 49 and 50, and it is rectified there by a forming roller portion 201 of the roller 49. Now, the recording paper 25 as one copy is received by the copy receiver 44. Shafts 205 and 206 of the fixing rollers 41 and 42 are supported through bearings 207 and 208 by supporting members 209 and 210. The upper and lower supporting members 209 and 210 are combined pivotably at the respective ends with each other by a pin 211. One end of a fastening bolt 212 is fixed to the lower supporting member 210. Another end of the bolt 212 passes through an opening made in a part of the upper supporting member 209. A coil spring 213 is wound arround the bolt 212. Accordingly, the upper supporting member 209 is pressed downwards by rotating a fastening nut 214. Thus, the pressing force between the fixing rollers 41 and 42 can be adjusted by the fastening bolt 212 and nut 214.

As shown in FIG. 9B, the central axes of the fixing rollers 41 and 42 are shifted from each other, in other words, they intersect with each other in plan view. The intersection angle $\theta_1$ depends on the elasticity, length, diameter and pressing force of the fixing rollers 41 and 42. One example of the optimum dimensions is as follows: When the lengthwise direction of the recording paper 25 of the size A-4 is parallel to the direction of the fixing rollers 41 and 42, the total pressing force onto the fixing rollers 41 and 42 is 1800 kg, the diameter D of the fixing rollers 41 and 42 is 60 mm, the length l of the fixing rollers 41 and 42 is 320 mm, the distance L between the bearings 207 and 208 is 312 mm, the intersection angle $\theta_1$ is 1.46°, and the shifting length between the centers of the upper and lower bearings 207 and 208 is 3.89 mm.

Generally, the intersection angle $\theta_1$ and the shifting length may be within the ranges of $0° < \theta_1 < 2°$ and 1 to 30 mm. The range of the intersection angle $\theta_1$ of 0.5° to 1° and the shifting length of 2 mm are most suitable to a recording paper of ZnO. However, they are not suitable to a normal paper. However, a good result on pressure-fixation can be obtained for the normal paper within the above described ranges. The range of $1° \leq$ the intersection angle $\theta_1 \leq 2°$ is suitable to the normal paper from the view points of materials of commercially usable toner for pressure-fixation and of fixing rollers, and of size of a practical recording paper. If such a toner is developed in future that can be fixed on a recording paper at lower pressure, the intersection angle $\theta_1$ can be more descreased.

Since the fixing rollers are subjected to large load, their hardness should be high (preferably higher than $60H_{RC}$), they should have smooth surface, they should be resistive to shock, be tough and workable. For example, when alloy steel SKD-11 is used for the fixing rollers, the surface is hardened into hardness of more than $61H_{RC}$, and further it is plated with hard chromium.

A ball bearing, a roller bearing or a needle bearing may be used for the bearings 207 and 208, if it can endure large load. However, an automatic self-aligning bearing is preferable from the viewpoint of bend of the roller and uniform distribution of load. A thermal fixing device may be used instead of the pressure-fixing device.

When the recording paper 25 is introduced between the fixing rollers 41 and 42 in the pressure-fixing device, the rollers 41 and 42 are forcibly separated from each other in accordance with the thickness of the recording paper to form a gap. And when the paper has passed between the rollers 41 and 42, they are again pressed to each other. A high pressure, for example, a total pressure of 500 to 2500 kg is applied to the fixing rollers 41 and 42 to improve the fixing effect. Accordingly, an intensive shock and large noise occurs, when the paper leaves the fixing rollers 41 and 42. The non-fixed toner image on the paper is sometimes disturbed. In order to decrease such shock, the gap between the fixing rollers 41 and 42 is gradually increased and decreased in such a manner that the paper is slightly inclined to the axises of the rollers 41 and 42 and so introduced between the rollers 41 and 42.

In the illustrated embodiment, the axises of the fixing rollers 41 and 42 are shifted by the intersection angle $\theta_1$ from each other, as shown in FIG. 9B. The shock between the rollers 41 and 42 can be relaxed to a certain extent by such a manner. Since the lower fixing roller 42 is a drive roller, it is arranged in parallel with the recording drum 21. The upper fixing roller 41 is shifted in axis by the angle $\theta_1$ from the lower fixing roller 42.

When the copy speed of the duplicator is as low as about ten copies per minutes, a necessary shock relaxation effect can be obtained only by provision of the intersection angle. However, when the copy speed of the duplicator is as middle or high as 30 to 150 copies per minutes, a further shock relaxation measurement is required for relaxing a larger shock.

In the illustrated embodiment, the separating belt 198 and the tension pulley 199 are one-sidedly arranged as shown in FIG. 9B, and an arcuate auxiliary guide member 202 is arranged at the left side of the paper feed guide member 37 with respect to the direction of the movement of the paper. By such arrangement, the further shock relaxation measure can be obtained. As shown in FIG. 9B, the width of the arcuate auxiliary guide member 202 is small, and it is positioned opposite to the separating belt 198 and tension pulley 199.

While the recording paper 25 is separated from the recording drum 21 by means of the separating belt 198 and tension pulley 199, the recording paper 25 is pinched between the pulley 199 and the transfer roller 33, and fed into the paper guide member 37. In that time, only the right end portion of the paper 25 with respect to the direction of the movement is driven by the tension pulley 199, and so it is moved forward faster than the left end portion of the paper 25. The left end portion of the paper 25 is curved with larger carvature than the curvature of the recording drum 21, due to the rigidity of the paper itself. Further, the left end portion of the paper 25 is guided on the arcuate auxiliary guide member 202 which is convex as shown in FIG. 8, and so it makes a detour. Accordingly, the paper 25 is introduced between the rollers 41 and 42 in such a manner that the front edge of the paper is inclined by an angle $\theta_2$ to the central axis of the lower fixing roller 42 or that of the recording drum 21. The inclination angle $\theta_2$ of the front edge of the paper 25 is opposite to the intersection angle $\theta_1$ of the upper fixing roller 41. Accordingly, the relative inclination angle $(\theta_1+\theta_2)$ between the central axis of the upper fixing roller 41 and the front edge of the paper 25, is larger than both of the angles $\theta_1$ and $\theta_2$. Accordingly, the differences between the times at which the right and left end portions of the paper 25 are pressed between the fixing rollers 41 and 42, are increased to relax the shock much.

When the recording paper has sufficient rigidity, the above described time difference can be obtained without the auxiliary guide member 202 constituting a detour. However, it is preferable to use the auxiliary guide member 202 in order to stably transport the paper. Further, when the auxiliary guide member 202 is used, the separating belt 198 and the tension pulley 199 may be arranged at both sides of the recording drum 21 with respect to the direction of the movement of the paper.

The cleaning device 45, as shown in FIG. 9A, includes the air box 47 which has a suction opening 217 and arranged adjacent to the magnetic drum 21, a suction hose 218 connected to the air box 47, and the cleaning blade 46 which is rotatably supported by a pin 220 and extends to the close position between the air box 47 and the magnetic drum 21. The cleaning blade 46 is so long as to extend over the whole width of the drum 21, and it is urged in the counter-clockwise direction (FIG. 9A) round the pin 20 by a coil spring 219. Accordingly, the top end portion of the cleaning blade 46 is so designed as to elastically contact with the surface of the drum 21. The rear end of the cleaning blade 46 is connected to a plunger-solenoid 222. An air tight material 221 fixed to the air box 47 is interposed between the air box 47 and the blade 46.

The remaining toner on the recording drum 21 after the transfer operation is scraped from the surface of the recording drum 21 by the cleaning blade 46, and is led through the air box 47 and the suction hose 218 to a filter (not shown) by a not shown blower. During the copy mode, the top end of the blade 46 is pressed to the recording drum 21 by spring action of the coil spring 219, to scrape the remaining toner for cleaning. However, in the latent image record in which the recording drum 21 is rotated at the high speed, the plunger-solenoid 222 is energized to pull the rear end of the blade 46 rightwards (FIG. 9A), and therefore to slightly rotate the blade 46 in the clockwise direction (FIG. 9A) round the pin 220. Accordingly, the top end of the blade 46 is separated from the surface of the recording drum 21. It is preferable that the blade 46 is made of hard and flexible material such as brass or phosphor bronze thin plate.

The erasing head 48 includes a long permanent magnet 226 which extends over the whole width or whole effective width of the recording drum 21, and long housings 227 and 228 made of magnetic material by which the permanent magnet 226 is held therebetween. In the latent image erasing operation, a rotary solenoid 229 is energized to rotate the erasing head 48 and to bring a magnetic gap 230 close to the recording drum 21. When the recording drum 21 is rotated one revolution, the latent image on the whole surface of the recording drum 21 is erased by the erasing head 48. And the rotary solenoid 229 is deenergized to rotate the erasing head 48 back to the original position shown in FIG. 9A.

In the illustrated embodiment, the permanent magnet is used for the erasing head 48. However, an electromagnet (a coil type) may be used instead of the permanent magnet. When the whole effective surface of the recording drum 21 is scanned by the magnetic recording head 22, the erasing head 48 may be omitted, since the whole effective surface is saturated. However, it is better to use the erasing head, because a scanning portion corresponding to blank portions of the document is skipped over for the latent image record in order to shorten the time required for the latent image record. The latent image is erased immediately after the copies of the desired number are produced. Or it is erased immediately before a next latent image record. The latter erasing method is preferable, since additional copies are simiply produced, using the remaining latent image.

The recording paper 25 may be a normal recording paper. For example, a normal paper of 55 kg paper type or 70 kg paper type for printing may be used as the recording paper 25. The normal paper does not need to be subject to a special surface treatment. However, in order to improve the transfer efficiency, it may be subject to a similar surface treatment to a recording paper used for PPC which is one kind of a copying machine far a normal paper.

Figure 10B:
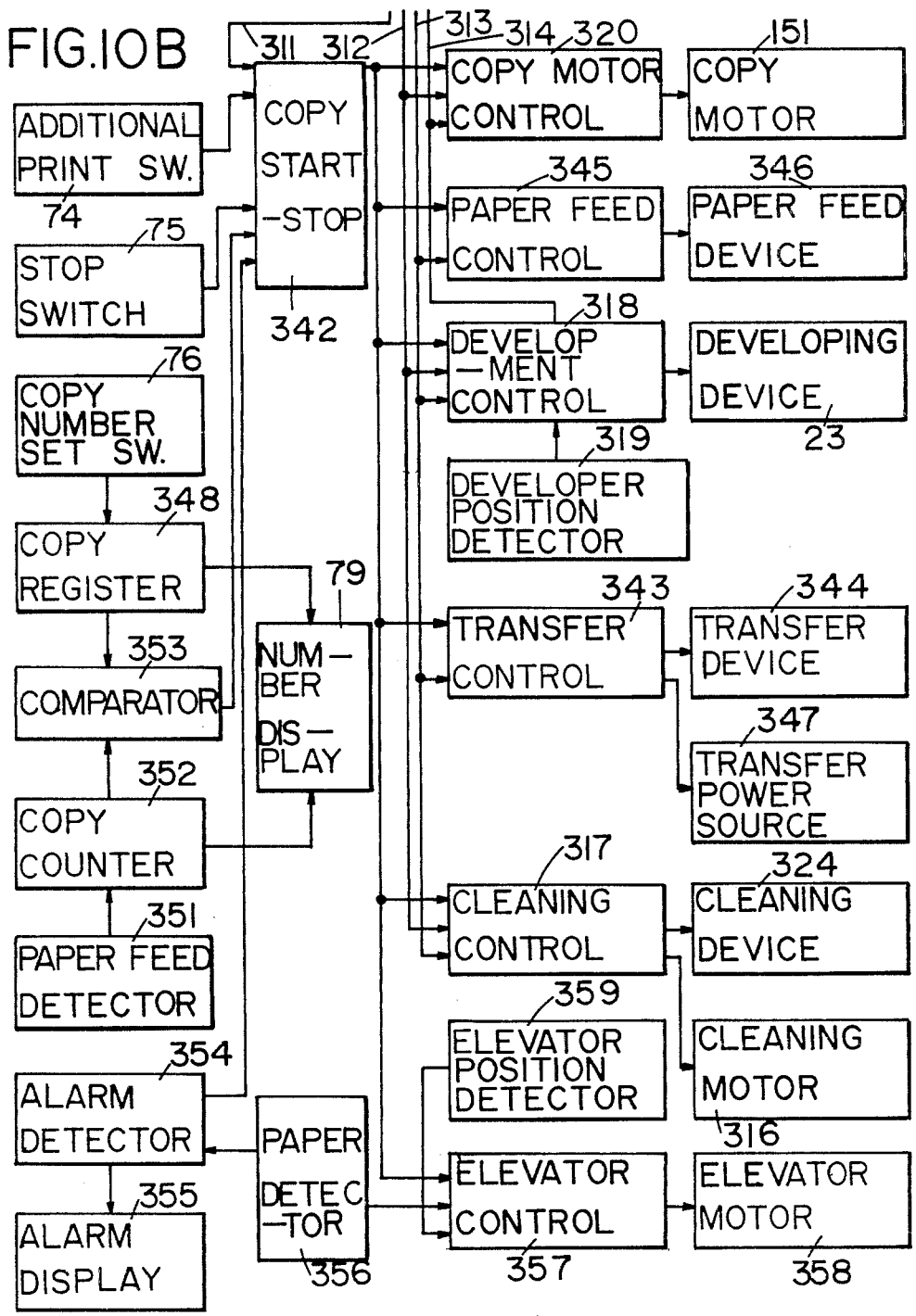
FIG. 10B is a block diagram of another half of the electrical control portion of the duplicator of FIG. 4.

FIG. 10A and FIG. 10B show a block diagram of the electrical control portion of the duplicator whose mechanical constructions are shown in FIG. 1 to FIG. 9. Lines 311, 312, 313 and 314 in FIG. 10A are connected to lines 311, 312, 313 and 314 in FIG. 10B, respectively. The combination of FIG. 10A and FIG. 10B shows the whole of the electrical control portion of the duplicator.

In FIG. 10A and FIG. 10B, a latent image forming start-stop circuit 315 operates with the pushing of the copying switch 73 which is arranged in the operating panel 72 shown in FIG. 4. The latent image forming mode starts.

The start-stop circuit 315 operates a cleaning control circuit 317 to drive a cleaning motor 316 (FIG. 10B) which drives the suction blower of the cleaning device 45 shown in FIG. 9A. Next or concurrently with the operation of the start-stop circuit 315, a development control circuit 318 operates in accordance with the detecting signal of a developer position detector 319 which detects the position of the development device 23 shown in FIG. 9A. When the development device 23 is located at the upper position, the development control circuit 318 operates a copy motor control circuit 320 to drive the copy motor 151. The recording drum 21 is rotated at the low speed of, for example, 100 r.p.m. by the copy motor 151. The shaft 165 of the development device 23 is rotated to lower the development device 23. The copy motor 151 stops with the lowering of the development device 23. When the development device 23 is located at the lower position, the above described sequence is omitted.

Next, a primary scan motor control circuit 321 (FIG. 10A) operates to drive the primary scanning motor 139. The recording drum 21 starts to be rotated at the high speed of, for example, 3300 r.p.m. Next, or concurrently with operation of the start-stop circuit 315, a cleaning control circuit 317 operates to actuate a cleaning device 334. The solenoid 222 for the cleaning blade is energized to separate the cleaning blade 81 from the recording drum 21.

A rotary encoder 322 is connected directly to the rotary shaft of the recording drum 21. The output of the encoder 322 in synchronization with the rotation of the recordind drum 21 is supplied to a clock circuit 323. Index pulses and clock pulses are formed by the clock circuit 323. For example, one index pulse is formed every revolutions of the magnetic drum 21, and 3600 clock pulses are formed every revolutions of the magnetic drum 21. It is preferable that the cleaning control circuit 317 does not operate the solenoid 222 for the cleaning blade before a few, for example, three index pulses are supplied to the cleaning control circuit 317. In that case, the cleaning blade 46 contacts with the recording drum 21 for a few or three revolutions of the drum 21 to clean the latter.

Next, or concurrently with operation of the start-stop circuit 315, an erasing head control circuit 327 operates to actuate an erasing head device 329. The rotary solenoid 229 for the erasing head is energized to bring the magnetic gap 230 of the erasing head 48 close to the recording drum 21. The recorded latent image is erased from the recording drum 21 by the erasing head 48. The erasing head 48 is maintained close to the recording drum 21, until a few index pulses are supplied to the erasing head control circuit 327.

Next, or concurrently with operation of the start-stop circuit 315, a lamp circuit 328 (FIG. 10A) operates to light the lamps 13 and 14 shown in FIG. 5.

Next, it is detected that the rotational speed of the recording drum 21 is build up nearly to the rated speed, for example, at the speed of higher than 3000 r.p.m, and then the latent image record starts. For example, the detection can be easily effected by comparing pulses (of reference frequency) of an oscillator such as a crystal oscillator with the above described clock pulses obtained from the clock circuit 323.

First in the latent image record, an image pickup secondary scan control circuit 330 and a record secondary scan control circuit 331 operate to actuate an image pickup secondary scan device 332 and a record secondary scan device 334. Accordingly, the pulse motor 126 and the electro-magnetic clutch 129 shown in FIG. 5, and the pulse motor 162 and the electro-magnetic clutch 158 start to operate. The secondary scan of the image pickup device and that of the record device start. And a recording head access control circuit 333 operates to actuate an access device 337. The solenoid 145 for the recording head is energized to bring the recording head 22 close to the recording drum 21.

Next, an image pickup control circuit 335 starts to operate. Video signals from the CCDs 16a and 16b as image pickup elements are supplied to a latent image record circuit 336. Video currents flow through the coil of the recording head 22 to form a magnetic latent image onto the recording drum 21.

Figure 11:
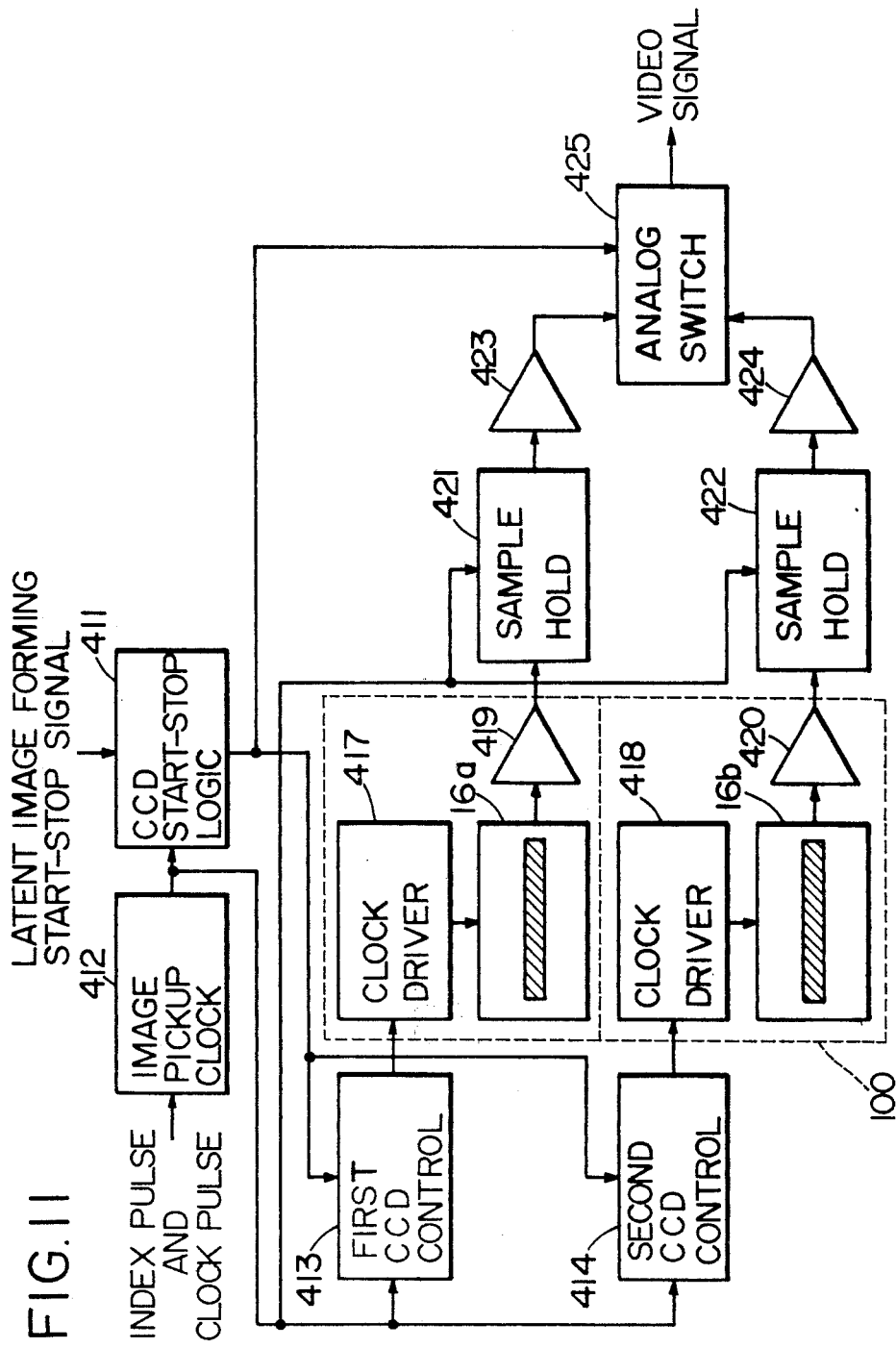
FIG. 11 is a block diagram of an image pickup control circuit shown in FIG. 10A.

FIG. 11 shows a block diagram of the image pickup control circuit 335. The control circuit 335 functions to transmit read-out signals of the document at a predetermined timing for the latent image record in use of one or more image pickup elements such as CCD image sensors having, for example, 1728 or 2048 bits. Two CCD image sensors are used in the illustrated embodiment.

The image pickup control circuit shown in FIG. 11 starts to operate at the time when the latent image record start signal is supplied to a CCD start-stop logic circuit 411 from the latent image forming start-stop circuit 315 shown in FIG. 10A. The index pulses and clock pulses from the clock circuit 323 shown in FIG. 10A are supplied to an image pickup clock circuit 412. Image pickup index pulses and image pickup clock pulses are obtained from the image pickup clock circuit 412. These image pickup pulses are supplied to the CCD start-stop logic circuit 411, first and second CCD control circuits 413 and 414, and sample holding circuits 415 and 416 so that the image pickup control circuit of FIG. 11 operates with reference to the image pickup pulses.

The CCD start-stop logic circuit 411 generates signals by which the first and second CCD control circuit 413 and 414 start to read out and stop the read-out at suitable timings, with the image pickup index pulses corresponding to the reference position on the recording drum 21 supplied from the image pickup clock circuit 412. Such operation is shown by an image pickup control timing chart of FIG. 12.

Figure 12:
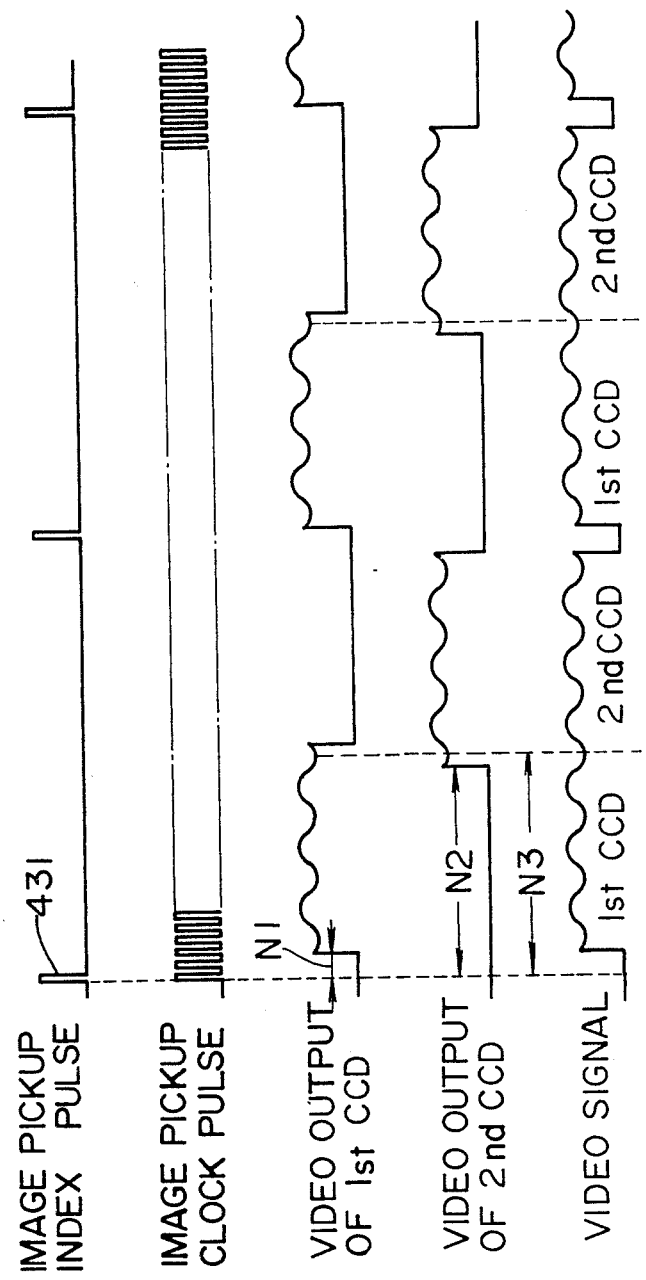
FIG. 12 is a time chart of an image pickup control for explaining operations of the image pickup control circuit of FIG. 11.

Next, there will be described the image pickup control timing chart shown in FIG. 12. The CCD start-stop logic circuit 411 operates so that the read-out video output from the first CCD 16a starts in a time $N_1$ after an image pickup index pulse 431, the read-out video output from the second CCD 16b starts in a time $N_2$ after the image pickup index pulse 431, and the read-out video outputs from the first and second CCDs 16a and 16b are combined in a time $N_3$ after the image pickup index pulse 431. The first and second CCD control circuits 413 and 414 produce transfer pulses, transfer gate pulses and reset pulses at timings necessary to drive the CCDs 16a and 16b. Clock drive circuits 417 and 418 work to supply the above described pulses to CCDs 16a and 16b. The clock drive circuits 417 and 418, the CCDs 16a and 16b, and video amplifiers 419 and 420 are mounted on the same printed boards 107 and 108 shown in FIG. 5, respectively. The printed boards 107 and 108 are mounted on the image pickup carriage 100. Whenever one line of the document 12 is read out, the image pickup carriage 100 is moved by the length of one line, and a next line of the document 12 is read out.

The CCD image sensors 16a and 16b may be of the 1728 bits type or the 2048 bits type. When the two CCD image sensors 16a and 16b are used, the document is read out at such high resolving power as 3456 bits or 4096 bits.

The two signals from the CCDs 16a and 16b are processed through the video amplifiers 419 and 420, the sample holding circuits 421 and 422 and amplifiers 423 and 424 into continuous signals. The video outputs form the CCDs 16a and 16b are combined by an analog switch 425, as shown in FIG. 12. Thus, a predetermined video signal is obtained from the analog switch 425.

When the CCD image sensors 16a and 16b contain sample hold circuits, and amplifiers, the sample hold circuits 421 and 422 and the amplifiers 423 and 424 can be omitted from the circuit shown in FIG. 11.

The video outputs from plural CCD image sensors are combined to obtain a video signal for the document, in the following manner.

For example, when two CCD image sensors are used, each CCD image sensor is so designed as to read out larger than one half of the width of the document. Both of the CCD image sensors read out the central portion of the document. The start times $N_1$ and $N_2$ of the video outputs from the CCD image sensors are so selected that the video outputs from the CCD image sensors overlap each other as shown in FIG. 12. The CCD image sensors are changed over into one from another at the suitable timing $N_3$ to obtain a continuous video signal for the document. The timings $N_1$, $N_2$ and $N_3$ may be adjusted in accordance with the number of the bits of the CCD image sensors.

Returning to FIGS. 10A and 10B, there will be described the control portion of the duplicator.

The above described video signal is processed with a latent image record circuit 336 to energize the magnetic recording head 22. The latent image record circuit 336 may include a light distribution correction circuit for the lamps 13 and 14, an illumination control circuit, a $\gamma$-correction circuit, a docuemnt density correction circuit and any other circuit. Or the video signal may be variously adjusted by the adjusting switch 77 arranged in the operating panel 72. For example, a video signal for a negative document can be converted into another video signal for a corresponding positive document. When the ground of a document is colored, a video signal for color can be converted into another video signal for white. A video signal for low density (little contrast) document can be converted into another video signal for high density (great contrast) document. Or an image of the document can be enlarged or reduced.

Next, there will be described the enlarging operation and the reducing operation.

According to the duplicator of this embodiment, the image can be enlarged and reduced without changing the relative position among the document 12, lens system 97 and image pickup elements 16a and 16b. Next, one example of the reducing operation will be described. It is assumed that the image is recorded on a scale of one to one (namely in dimensions of the document without enlargement and reduction) at 1800 image pickup clock pulses per one revolution of the recording drum 21. For reduction of image, the frequency of the image pickup clock pulse is doubled to 3600 pulses per one revolution of the recording drum 21 by a frequency multiplier. In other words, the pitch of the image pickup clock pulses for reduction is shortened to one-half of the pitch of the image pickup clock pulse for actual size. Such image pickup clock pulses are supplied to the image pickup control circuit 335. The period of the video signal for one scanning line of the document is reduced to one half in comparison with the above described case in which the image is neither enlarged nor reduced, although the number of the CCDs is not varied. Accordingly, when the video signals from the CCD image sensors driven by the pulses reduced to half in pitch are recorded on the recording drum 21, the image is reduced to half of the image for actual scale in the primary scanning direction.

With respect to the secondary scanning direction, the length of the movement for secondary scanning in the recording mechanism is reduced to one half of the length of the movement for secondary scanning in the image pickup mechanism. In such a manner, the image is reduced to one half also in the secondary scanning direction. For example, when the length of the movement for secondary scanning in the image pickup mechanism is 0.2 mm per 12 pulses by the pulse motor 126 shown in FIG. 5, the length of the movement for secondary scanning in the recording mechanism is 0.125 mm per 6 pulses in one revolution of the recording drum 21.

In the above described manner, the latent image is reduced to one half in size both in the primary scanning direction and in the secondary scanning direction. Further, it will be understood from the above description that the reducing ratio in the primary scanning direction can be differed from that in the secondary scanning direction.

For the enlarging operation, the pitch of the image pickup clock pulses is widened with respect to the primary scanning direction. And the length of the movement for secondary scanning in the recording mechanism is increased in comparison with the length of the movement for secondary scanning in the image pickup mechanism. Further, it will be understood that the enlarging ratio in the primary scanning direction can be differed from that in the secondary scanning direction. Further, when there is provided means for shifting start timings for image pickup, it is possible to deform the image into parallelogram.

Figure 13:
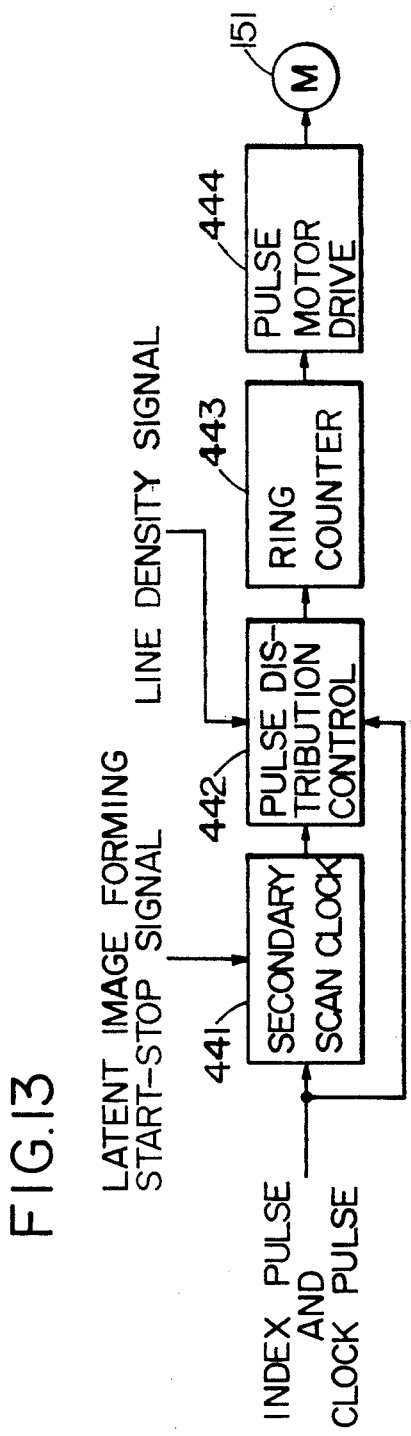
FIG. 13 is a block diagram of a record secondary scan control circuit.

FIG. 13 is a block diagram of the record secondary scanning control circuit 331 shown in FIG. 10A. This circuit works to control the record secondary scan device for moving the magnetic recording head 22 in the axial direction of the recording drum 21 in accordance with the clock pulses supplied from the clock circuit 323 so that the informations from the document are recorded line by line on the recording drum 21.

An instruction signal for a scanning line density, for example, 4 lines/mm or 8 lines/mm, which is obtained from the instruction switch 78 shown in FIG. 4, is supplied to the record secondary scan control circuit 331 of FIG. 13. The drive system for the recording mechanism is moved by the length determined by the instruction signal. For example, when the pulse motor is a drive source, it is applied in this case that a rotational angle of the pulse motor is proportional to the number of input pulses to the pulse motor.

The clock pulses from the rotary encoder 322 and the clock circuit 323 are supplied to a secondary scan clock circuit 441. Secondary scan clock pulses of the pulse width of, for example, about 0.5 ms to 3 ms are generated from the secondary scan clock circuit 441. However, it is preferable that the frequency of the secondary scan clock pulses does not coincide with a resonant frequency of the pulse motor. The secondary scan clock pulses are supplied to a pulse distribution control circuit 442. For example, 12 pulses for the density of 4 lines/mm, 6 pulses for the density of 8 lines/mm or 4 pulses for the density of 12 lines/mm are supplied to a ring counter 443 for one revolution of the recording drum 21 (corresponding to the period of the index pulses from the rotary encoder 322) in accordance with the instruction signal or the line density signal. The ring counter 443 and a pulse motor drive circuit 444 for driving the pulse motor 151 for secondary scanning of the recording device, to which the output of the ring counter 443 is supplied, may be ones usually used for pulse motor drive.

When the length of the movement for secondary scanning is 0.25 mm (¼ mm) for 12 pulses to the pulse motor, it is 0.125 mm (⅛ mm) for 6 pulses to the pulse motor, or it is 1/12 mm for 4 pulses to the pulse motor. Thus, the length of the movement is determined in accordance with the line density signal. In order to prevent vibration of the pulse motor, a circuit to adjust the pitches of pulses may be provided in the pulse distribution control circuit 442. For example, when the pitch between the first and second pulses is increased by the adjusting circuit, the pulse motor can be smoothly started. And when the pitch between the last pulse and the previous pulse is adjusted by the adjusting circuit, the pulse motor can be stopped with the minimum overshooting.

The record secondary scan control circuit 331 starts to operate with the latent image forming start signal supplied from the latent image forming start-stop circuit 315, and stops with the latent image forming stop signal supplied from the latent image forming start-stop circuit 315. The latent image forming start signal and the latent image forming stop signal are supplied to the secondary scan clock circuit 441. The image pickup secondary scan control circuit 330 shown in FIG. 10A is equal to the record secondary scan control circuit 331 in construction and function.

A side end detector 341 for detecting the end of the movement for secondary scanning, as shown in FIG. 10A, is provided in the secondary scan devices for the image pickup mechanism and the record mechanism. For example, it may comprise the end detecting switch 133 shown in FIG. 5. When the end of the secondary scan is detected by the detector 341, the latent image forming stop signal is generated from the latent image forming start-stop signal 315. Similarly, when the stop switch 75 shown in FIG. 4 is pushed, the latent image forming stop signal is generated from the latent image forming start-stop circuit 315. The stop switch 75 corresponds to a stop switch 204 in FIG. 10A.

With the latent image forming stop signal, a record head access control circuit 333 operates an access device 337 to deenergize the solenoid 145 for the record head. The record head 22 is separated from the recording drum 21. At the same time, the image pickup control circuit 335, the image pickup elements 16a and 16b and the latent image record circuit 336 stop their operations. Thus, the latent image record stops. The lamp circuit 328 deenergizes the lamps 13 and 14. The image pickup secondary scan control circuit 330 and the record secondary scan control circuit 331 operate the image pickup secondary scan device 332 and the record secondary scan device 334 to stop the pulse motors 126 and 162, and to deenergize the clutches 129 and 158 through which the image pickup carriage 100 and the secondary scanning mount 24 are coupled with the motors, respectively. Accordingly, the image pickup carriage 100 and the secondary scanning mount 24 are moved back to the start points by function of the restoring springs and governers. It is of course that the pulse motors may be rotated in the reverse direction to move the image pickup carriage 100 and the secondary scanning mount 24 back to the start points.

With the latent image forming stop signal, a primary scan motor control circuit 321 operates to brake the primary scan motor 139. The primary scan motor 139 may be braked by feeding windings of the motor with currents of the same phase. By the brake, the rotational speed of the motor 139 is reduced from the high speed of, for example, 3300 r.p.m to the low speed of, for example, 100 r.p.m.

With the latent image forming stop signal, a copy start-stop circuit 342 (FIG. 10B) starts to operate. When the rotational speed of the primary scan motor 139 becomes low than the predetermined speed (for example, 100 r.p.m), the primary scan motor 139 is deenergized, and then a copy motor control circuit 320 operates to energize the copy motor 151. Accordingly, the recording drum 21 is changed over into the low speed rotation (for example, 100 r.p.m).

In the copy mode, first a cleaning control circuit 317 operate to actuate a cleaning device 324. The solenoid 222 for cleaning is energized to contact the cleaning blade 46 with the recording drum 21. When energization of a cleaning motor 316 is maintained, the cleaning suction continues. A transfer control circuit 343 operates to actuate a transfer device 344. The separating belt 198 starts to run. The development control circuit 318 operates to actuate the developing device 23. The eccentric cam 166 is rotated. The development device 23 is moved upward to be brought close to the recording drum 21.

The paper feed device, the developing device and the transfer device are operated at the suitable timings in accordance with the clock pulses supplied from the rotary encoder 322 and the clock circuit 323. 3600 clock pulses for one revolution of rotary encoder 322 are divided into ten. Thus, 360 angle pulses are formed for one revolution. The devices can be actuated in exact synchronization with the rotational positions of the recording drum 21, in use of the angle pulses. One angle pulse corresponds to one degree of the rotation of the recording drum 21. For example, a paper feed control circuit 345 actuates a paper feed device 346 at 168 degrees to rotate the paper feed roller 26. The record paper 25 is fed to the paper positioning rollers 29 and 30. Next, the paper positioning rollers 29 and 30 are driven at 260 degrees to transport further the recording paper 25. The development control circuit 318 actuates the developing device 23 at 302 degrees. The developing roller 171 rotates to develope the latent image on the recording drum 21. Next, a transfer control circuit 343 actuates a transfer device 344 at 144 degrees. The transfer roller 33 is contacted with the recording drum 21. The recording paper 25 is pinched between the recording drum 21 and the transfer roller 33. At the same time, a transfer power source is connected to apply a DC voltage between the transfer roller 33 and the recording drum 21.

On the other hand, an operator actuates the copy number set switch 76 shown in FIG. 4 to set a desired number of copies. The set value is memorized in a copy register 348, and displayed in the number display 79 which comprises, for example, a seven-segment light emission diode array. The paper feeding is detected by a paper feed detector 351 which comprises the light emission diode 194 and the light-sensitive element 195 shown in FIG. 8. The fed recording papers 25 are counted by a copy counter 352. The content of the copy counter 352 is displayed in the display 79. The outputs of the copy register 348 and copy counter 352 are compared with each other by a comparator 353. When they coincide with each other, a copy end signal is generated from the comparator 353, and it is supplied to the copy start-stop circuit 342. Until the copy end signal is generated, one copying operation per one revolution of the recording drum 21 is repeated. In each revolution of the recording drum 21, the paper feed roller 26 is actuated at 168 angle pulses, and the paper positioning rollers 29 and 30 are actuated at 260 angle pulses, to feed the recording paper 25. The paper feed roller 26 and the paper positioning rollers 29 and 30 are intermittently driven to feed papers 25 one by one. However, the developing roller 171 and the transfer roller 33 are continuously driven, until the copies of the desired number are obtained.

When the copy end signal is generated, the copy start-stop circuit 342 operates to stop the operations of the paper feed control circuit 345 and paper feed device 346. The paper feed stops. Next, the development control circuit 318 operates to stop the operation of the developing device 23. The developing roller 171 is stopped at the timing when the developing operation is finished for the last recording paper 25, for example, at 22 degrees, and the developing device 23 is moved downwards to the original position. Next, the transfer control circuit 343 operates to stop the operation of the transfer device 344. The transfer roller 33 is separated from the recording drum 21, at the timing when the last recording paper 25 has passed over the transfer roller 33, for example, at 112 degrees, and at the same time, the transfer power source 347 is disconnected. After it is confirmed that the last recording paper has been discharged into the copy receiver 44 and that the developing device 23 is located at the lower position, the copy motor control circuit 320 operates to stop the copy motor 151. At last, the cleaning motor 316 is stopped.

On the other hand, when it is detected by an alarm detector 354 that the papers 25 are exhausted in the elevator 28, that the toner is exhausted in the developing device 23, or that the paper 25 is jammed somewhere, the stop signal is generated from the copy start-stop circuit 342. It is preferable that the alarm condition is displayed by an alarm display 355 arranged in the operating panel 72 shown in FIG. 4. As already described, the copy mode may be stopped by the stop switch 75 arranged in the operating panel 72 shown in FIG. 4.

A paper detector 356 may comprise the paper position detectors 188 and 189 shown in FIG. 8. When it is detected by the paper detector 356 that the papers 25 are exhausted or become scarce, an elevator control circuit 357 is operated through the alarm detector 354. An elevator motor 358 is energized to move the paper elevator 28 downwards for paper supply. The lower limit position of the elevator 28 is detected by an elevator position detector 359 to deenergize the elevator motor 358. Further, the elevator motor 358 is so controlled by the paper detector 356 that the upper-most of the piled recording papers 25 is located at a position suitable to the paper feed roller 26.

The copy mode can be independently obtained by pushing the additional print switch 74 which is arranged in the operating panel 72. In that case, the previously recorded latent image is developed, and the developed image is transferred and fixed. Thus, the additional copies can be obtained.

The electrical control portion shown in FIG. 10A and FIG. 10B may be constructed by transistors, TTL IC (Transistor-Transistor Logic Integrated circuit) or micro processor.

Although the illustrative embodiment of the invention has been described in detail herein with reference to the accompanying drawings, it is to be understood that the invention is not limited to the precise embodiment, and that various changes and modifications can be effected therein by one skilled in the art without departing from the scope and spirit of the invention as defined in the appended claims.

What is claimed is:

1. A magnetic duplicator comprising an image pickup portion for obtaining an electrical video signal from a document to be copied, a printing portion for printing an image formed from said electrical video signal onto a recording paper, and a control portion for controlling operations of said image pickup portion and printing portion, said image pickup portion comprising:
(a) a document support for supporting said document;
(b) a light source for irradiating said document;
(c) an image pickup element for converting light received from said document into said electrical video signal;
(d) an optical means for introducing said light from said document onto said image pickup element; and
(e) a secondary scanning means for moving said image pickup element relative to said document so as to scan said document;

said printing portion comprising:
(f) a magnetic recording medium which has a surface for forming a magnetic latent image, said surface being able to move and having specific resistivity less than $10^{12}$ ohm-cm;
(g) a magnetic recording head for forming said magnetic latent image on said surface of the magnetic recording medium;
(h) a developing means for supplying a magnetic toner onto said surface of the magnetic recording medium to develop said magnetic latent image;
(i) a transporting means for moving said recording paper along a predetermined transport path;
(j) a transfer means for transferring the toner image on said surface of the magnetic recording medium onto said recording paper while said surface of the magnetic recording medium moves and said recording paper is moved along said transport path;
(k) means for applying electrostatic field between said magnetic recording medium and said transfer means so as to aid the transferring of said toner image;
(l) a fixing means for fixing said transferred toner on said recording paper;
(m) a cleaning means for cleaning the remaining toner on said surface of the magnetic recording medium after the transfer, said cleaning means including a cleaning blade and an air suction means; and
(n) a pulse generating means for generating pulses in synchronization with the movement of said surface of the magnetic recording medium; and said control portion comprising:
(o) a copy register for presetting the desired number of copies;
(p) a copy counter for counting the number of the obtained copies;
(q) a comparator for comparing the set number of said copy register with the counter value of said copy counter, said comparator generating a copy end signal when the counted value reaches the set number; and
(r) a control means which operates first for latent image forming mode and then operates for copy mode, with actuation of a copy switch, the operation for copy mode being repeated without returning to the latent image forming mode until said copy end signal is generated from said comparator, and the operations for latent image forming mode and copy mode being effected in accordance with the timing of said pulses;

where during said latent image forming mode, the light from said document is converted into the electrical video signal by said image pickup element, said electrical video signal is recorded on said surface of the magnetic recording medium to form said magnetic latent image thereon by said magnetic recording head, and said electrical video signal is read out from said image pickup element in accordance with the timing of said pulses so as to effect said movement of the magnetic recording medium and said read-out of the image pickup element in a predetermined relationship; and where during said copy mode, the magnetic latent image on said surface of the magnetic recording medium is developed by the magnetic toner from said developing means, the toner image is transferred onto said recording paper being moved along the predetermined transport path by said transfer means, the transferred magnetic toner is fixed on said recording paper by said fixing means, and the remaining magnetic toner on said surface of the magnetic recording medium after the transfer is removed for next development by said cleaning means.

2. A magnetic duplicator according to claim 1, in which said duplicator further comprises an additional copy switch, operated to control said developing, said transferring, said fixing and said cleaning means.

3. A magnetic duplicator according to claim 1, in which a plurality of said image pickup elements and lens systems for leading the reflected light to said image pickup elements are provided, wherein the combinations of said image pickup elements and lens systems are individually movable by position-adjusting means, and an image pickup control circuit is provided for combining individual video signals from said image pickup elements to form a continuous video signal.

4. A magnetic duplicator according to claim 1, in which said duplicator further comprises an erase head for erasing the magnetic latent image formed on the surface of the magnetic recording medium, and wherein means are provided for bringing said erase head into proximity with the surface of the magnetic recording drum.

5. A magnetic duplicator according to claim 4, in which said erase head comprises soft magnetic materials and a permanent magnet interposed between said soft magnetic materials, a gap portion being formed between said soft magnetic materials.

6. A magnetic duplicator according to claim 1, in which said developing means comprises a container for magnetic toner, arranged under said surface of magnetic recording medium, and movable upwards and downwards relative to said surface of the magnetic recording medium, a developing roller arranged in said container and rotated, and means for moving said container upwards and downwards, said container being moved downwards in said latent image forming mode by said means to separate said developing roller from said surface of the magnetic recording medium, and being moved upwards in said copy mode to bring said developing roller near said surface of the magnetic recording medium.

7. A magnetic duplicator according to claim 1, in which said transfer means comprises a transfer roller being able to contact with said surface of the magnetic recording medium, and means for separating said transfer roller from said surface of the magnetic recording medium in said latent image forming mode, and contacting said transfer roller with said surface of the magnetic recording medium in said copy mode, and when said transfer roller contacts with said surface of the magnetic recording medium being moved in said copy mode, said recording paper is pinched and transported between said magnetic recording medium and said transfer roller.

8. A magnetic duplicator according to claim 1, in which said fixing means comprises a pair of fixing rollers and means for pressing said fixing rollers to each other, said recording paper being passed over between said fixing rollers in said fixing operation, and a paper feed guide having a detour only for one side end portion of said recording paper is arranged in the paper transport path extending from said surface of the magnetic recording drum and said pair of fixing rollers, so that said one side end portion of said recording paper is led later into said pair of fixing rollers than another side end portion of said recording portion.

9. A magnetic duplicator according to claim 8, in which said paper feed guide comprises a wide guide body on which said recording paper runs and a narrow auxiliary guide member having an arcuate surface and being arranged over one side end portion of said wide guide body.

10. A magnetic duplicator according to claim 1, in which said fixing means comprises a pair of fixing rollers and means for pressing said fixing rollers to each other, said recording paper being passed over between said fixing rollers in said fixing operation, said magnetic recording medium comprises a magnetic recording drum to be rotated, the outer peripheral surface constitutes said surface forming a magnetic latent image, a separating belt is mound on one side end portion of said magnetic recording drum, and in the transfer operation, said recording paper is pinched between said transfer roller contacting with said magnetic recording drum and said separating belt, to be transported, so that one side end portion of said recording paper, with respect to the direction of the movement of said recording paper, is moved more forward than another side end portion of said recording portion, while said recording paper is led into said pair of fixing rollers, and a paper feed guide having a detour only for another side end portion of said recording paper is arranged in the paper transport path extending from said surface of the magnetic recording drum and said pair of fixing rollers, so that said other side end portion of said recording paper is led later into said pair of fixing rollers than said one side end portion of said recording paper.

11. A magnetic duplicator according to claim 10, in which said paper feed guide comprises a wide guide body on which said recording paper runs and a narrow auxiliary guide member having an arcuate surface and being arranged over said other side end portion of said wide guide body.

12. A magnetic duplicator according to claim 11, in which the axis of the drive one of said fixing rollers is substantially parallel with the axis of said magnetic recording drum, the axis of the idle one of said fixing rollers is horizontally shifted by a first angle from the axis of said magnetic recording drum, and when the top edge of said recording paper is inclined by a second angle to the axis of the drive one of said fixing rollers in such a manner that said other side end portion of the recording paper is led later into said pair of fixing rollers than said one side end portion of the recording paper, the sum of said first and second angles of the top edge of said recording paper to the axis of the idle one of said fixing rollers is larger than either of said first and second angles.

13. A magnetic duplicator according to claim 1, in which said cleaning means comprises a rotatable cleaning blade extending over the effective width of the surface of said magnetic recording medium in the width direction of said magnetic recording medium, and means for separating said blade from the surface of said magnetic recording medium in said latent image forming mode and contacting said blade with the surface of said magnetic recording medium in said copy mode.

14. A magnetic duplicator according to claim 1, in which said duplicator further comprises a drive means for moving said surface of the magnetic recording medium at a higher speed in said latent image forming mode and moving said surface of the magnetic recording medium at a lower speed in said copy mode.

15. A magnetic duplicator according to claim 1, in which means are provided for changing at least one of the read-out rate of said image pickup element and the rotational speed of said magnetic recording drum relative to the movement rate of said secondary scanning means of said image pickup portion, whereby the image of said document is reduced or enlarged by said rate changing means.

16. A magnetic duplicator according to claim 15, in which means are provided for changing the interval of pulses obtained from said rotary encoder, said video signal being read out from said image pickup element in correspondence with the pulses obtained from said interval changing means, whereby the read-out rate of said image pickup element can be changed by said interval changing means, said secondary scanning means of the image pickup portion being driven with the pulses of said interval changing means, such that the movement rate of said secondary scanning means can be changed to enlarge or reduce the image of said document.

17. A magnetic duplicator comprising an image pickup portion for obtaining an electrical video signal from a document to be copied, a printing portion for printing an image formed from said electrical video signal onto a recording paper, and a control portion for controlling operation of said image pickup portion and of said printing portion:

said image pickup portion comprising:
 (a) a document support for supporting said document;
 (b) a light source for irradiating said document;
 (c) an image pickup element for converting light received from said document into said electrical video signal;
 (d) optical means for introducing said light from said document onto said image pickup element; and
 (e) secondary scanning means for moving said image pickup element relative to said document so as to scan said document;

said printing portion comprising:

(f) a rotatable magnetic recording drum comprising on its outer peripheral surface a latent image forming surface;

(g) a drum drive means for rotating said magnetic recording drum at a higher speed during a latent image forming mode and at a lower speed during a copy mode;

(h) a magnetic recording head for forming a magnetic latent image on said latent image forming surface of the magnetic recording drum;

(i) a head access means for moving said magnetic recording head with respect to said magnetic latent image forming surface of the magnetic recording drum;

(j) a head secondary scanning means for moving said magnetic recording head in the axial direction of said magnetic recording drum so as to secondarily scan said latent image forming surface;

(k) a developing means for supplying a magnetic toner onto said surface of the magnetic recording medium to develop said magnetic latent image, said developing means including a container of magnetic toner and means for bringing said container into proximity with said surface of the magnetic recording drum in the copy mode;

(l) a transporting means for running said recording paper along a predetermined transport path;

(m) a transfer means for transferring the toner image from said surface of the magnetic recording drum onto said recording paper when said magnetic recording drum rotates and said recording paper runs along said transport path;

(n) means for applying an electrostatic field between said magnetic recording drum and said transfer means so as to aid the transferring of said toner image;

(o) a fixing means for fixing said transferred toner on said recording paper;

(p) a cleaning means for cleaning toner remaining on said surface of the magnetic recording drum after the transfer, said cleaning means including a cleaning blade, and a blade access means for separating said blade from said surface of the magnetic recording drum in the latent image forming mode and bringing said blade near said surface of the magnetic recording drum in the copy mode; and (q) pulse generating means for generating pulses in synchronization with the rotation of said surface of the magnetic recording drum; and said control portion comprising:

(r) a copy register for presetting the desired number of copies;

(s) a copy counter for counting the number of the obtained copies;

(t) a comparator for comparing the set number of said copy register with the counted value of said copy counter said comparator generating a copy end signal when the counted value reaches the set number; and (u) a control means which operates first in a latent image forming mode and then operates in a copy mode, mode switching being accomplished by actuation of a copy switch, operations in the copy mode being repeated without returning to the latent image forming mode until said copy end signal is generated from said comparator, and the operations for latent image forming mode and copy mode being effected in accordance with the timing of said pulses, where in said latent image forming mode, the following operations are effected:

(A) with the detection of actuation of said copy switch, said magnetic recording drum is rotated at the higher speed by said drum drive means, said light source is energized for irradiating said document, and said cleaning blade is separated from said surface of the magnetic recording drum;

(B) when it is detected that the rotational speed of said magnetic recording drum has reached a predetermined value, said magnetic recording head is brought near said surface of the magnetic recording drum by said head access means;

(C) said video signal is read out from said image pickup element synchronized with the pulse of said pulse generating means;

(D) said video signal is supplied through a recording head control circuit of said control means to said magnetic recording head to form the latent image of said document on said surface of the magnetic recording drum;

(E) said secondary scanning means of the image pickup portion is driven to move said image pickup element relative to said document;

(F) said head secondary scanning means of the printing portion is driven to move said magnetic recording head in the axial direction of said magnetic recording drum;

(G) the above operations (C) to (F) continue until the end of the secondary scanning is detected, whereupon said light source is de-energized, said magnetic recording head is separated from said magnetic recording drum, and said secondary scanning means of the image pickup portion and printing portion are moved back to their original positions; and wherein the following operations are performed during the copy mode:

(H) said drum drive means is caused to drive said magnetic recording drum at the lower speed;

(I) said cleaning blade is contacted with said surface of the magnetic recording drum;

(J) said container of magnetic toner is brought near said surface of the magnetic recording drum;

(K) said electrostatic field is applied between said magnetic recording drum and said transfer means;

(L) said transporting means is driven to run said recording paper along said predetermined path;

(M) said toner transporting means is operated to apply said toner onto said surface of the magnetic recording drum;

(N) the number of the fed recording papers is counted by the copy counter;

(O) the above operations (L) to (N) are repeated until the output of said comparator shows that the counted value reaches the set number of said copy register;

(P) when the output of said comparator shows that the counted value reaches the set number of the said copy register, the paper feeding stops;

(Q) the operation of said toner transporting means stops;

(R) said container is removed from said surface of the magnetic recording drum;

(S) and the rotation of said drum stops.

18. A magnetic duplicator according to claim 17, in which said duplicator further includes an additional copy switch, and said control means detects actuation of said additional copy switch to sequentially control said operations (H) to (S).

19. A magnetic duplicator according to either of claims 17 or 18, in which said applying means does not apply electrostatic field between said magnetic recording drum and said transfer means in the latent image forming mode, and applies electromagnetic field therebetween in the copy mode.

20. A magnetic duplicator according to either of claims 17 or 18 in which said transfer means comprises a transfer roller and means for separating said transfer roller from said surface of the magnetic recording drum in the latent image forming mode and contacting said transfer roller with said surface of the magnetic recording drum in the copy mode.

21. A magnetic duplicator according to claim 17, in which a detecting means is provided for detecting the position of said developing means, and if when said operation (A) is effected, it is detected by said detecting means that said container is near said surface of the magnetic recording drum, said container is separated from said surface of the magnetic recording drum.

22. A magnetic duplicator according to claim 17, in which means are provided for changing at least one of the readout rate of said image pickup element and the rotational speed of said magnetic recording drum with respect to the movement rate of said secondary scanning means of the image pickup portion and printing portion, and the image of said document is enlarged or reduced by said changing means.

23. A magnetic duplicator according to claim 22, in which means are provided for changing interval of pulses obtained from said pulse generation means, said video signal is read out from said image pickup element with the pulses obtained from said interval changing means, the read-out rate of said image pickup element can be changed by said interval changing means and one of said secondary scanning means of the image pickup portion and printing portion is driven with the pulses of said interval changing means, whereby the relative movement rate of said secondary scanning means can be changed to enlarge or reduce the image of said document.

* * * * *

UNITED STATES PATENT AND TRADEMARK OFFICE
CERTIFICATE OF CORRECTION

PATENT NO. : 4,268,872
DATED : May 19, 1981
INVENTOR(S) : Norio Kokaji et al.

It is certified that error appears in the above—identified patent and that said Letters Patent is hereby corrected as shown below:

Column 4, line 30, "medium" should read -- drum --.

Column 6, line 3, "devce" should read -- device --.

Column 12, line 58, "1" (numerical) should read -- $\ell$ -- (alphabetical).

Signed and Sealed this

Twenty-seventh Day of April 1982

[SEAL]

Attest:

GERALD J. MOSSINGHOFF

Attesting Officer — Commissioner of Patents and Trademarks

UNITED STATES PATENT AND TRADEMARK OFFICE
CERTIFICATE OF CORRECTION

PATENT NO. : 4,268,872

DATED : May 19, 1981

INVENTOR(S) : Norio Kokaji et al.

It is certified that error appears in the above—identified patent and that said Letters Patent is hereby corrected as shown below:

Column 11, line 38, "earler" should read -- earlier --.

Column 15, line 32, "simiply" should read -- simply --.
Column 15, line 42, "far" should read -- for --.
Column 16, line 19, "recordind" should read -- recording --.

Column 18, line 27, "docuemnt" should read -- document --.

Signed and Sealed this

Fifteenth Day of June 1982

[SEAL]

Attest:

Attesting Officer

GERALD J. MOSSINGHOFF

Commissioner of Patents and Trademarks